United States Patent
Dichiu et al.

(10) Patent No.: US 11,847,214 B2
(45) Date of Patent: Dec. 19, 2023

(54) MACHINE LEARNING SYSTEMS AND METHODS FOR REDUCING THE FALSE POSITIVE MALWARE DETECTION RATE

(71) Applicant: Bitdefender IPR Management Ltd., Nicosia (CY)

(72) Inventors: Daniel Dichiu, Buchare (RO); Andreea Dincu, Buchare (RO); Robert M Botarleanu, Constanta (RO); Sorina N. Zamfir, Buchare (RO); Elena A Bosinceanu, Fetesti (RO); Razvan Prejbeanu, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 480 days.

(21) Appl. No.: 16/853,934

(22) Filed: Apr. 21, 2020

(65) Prior Publication Data
US 2021/0326438 A1    Oct. 21, 2021

(51) Int. Cl.
*G06F 21/56* (2013.01)
*G06F 3/06* (2006.01)
*G06N 3/08* (2023.01)

(52) U.S. Cl.
CPC ............ *G06F 21/56* (2013.01); *G06F 3/0604* (2013.01); *G06F 3/065* (2013.01); *G06F 3/0673* (2013.01); *G06N 3/08* (2013.01); *G06F 2221/033* (2013.01)

(58) Field of Classification Search
CPC ........ G06F 21/56; G06F 3/0604; G06F 3/065; G06F 3/0673; G06F 2221/033; G06F 21/552; G06F 21/577; G06N 3/08; H04L 63/1425
See application file for complete search history.

(56) References Cited

U.S. PATENT DOCUMENTS

| | | | |
|---|---|---|---|
| 9,210,182 B2 | 12/2015 | Wright | |
| 9,779,238 B2 | 10/2017 | Mankin et al. | |
| 10,198,574 B1 | 2/2019 | Thioux et al. | |
| 10,250,617 B1 | 4/2019 | Gardner et al. | |
| 10,356,119 B1 | 7/2019 | Chang | |
| 11,010,472 B1 * | 5/2021 | Powers | G06K 9/6272 |
| 11,374,952 B1 * | 6/2022 | Coskun | G06N 3/0454 |

(Continued)

OTHER PUBLICATIONS

European Patent Office (EPO), International Search Report and Written Opinion dated Sep. 24, 2021 for PCT International Application No. PCT/EP2021/060293, international filing date Apr. 21, 2021, priority date Apr. 21, 2020.

*Primary Examiner* — Farid Homayounmehr
*Assistant Examiner* — Suman Debnath
(74) *Attorney, Agent, or Firm* — Law Office of Andrei D Popovici, PC

(57) ABSTRACT

In some embodiments, a behavior classifier comprises a set of neural networks trained to determine whether a monitored software entity is malicious according to a sequence of computing events caused by the execution of the respective entity. When the behavior classifier indicates that the entity is malicious, some embodiments execute a memory classifier comprising another set of neural networks trained to determine whether the monitored entity is malicious according to a memory snapshot of the monitored entity. Applying the classifiers in sequence may substantially reduce the false positive detection rate, while reducing computational costs.

13 Claims, 13 Drawing Sheets

(56) References Cited

U.S. PATENT DOCUMENTS

| | | | |
|---|---|---|---|
| 2014/0089264 A1* | 3/2014 | Talagala | G06F 3/065 |
| | | | 707/649 |
| 2017/0093897 A1 | 3/2017 | Cochin et al. | |
| 2017/0235949 A1 | 8/2017 | Niemela et al. | |
| 2018/0063181 A1* | 3/2018 | Jones | H04L 63/1433 |
| 2018/0278635 A1 | 9/2018 | Shin et al. | |
| 2019/0007434 A1 | 1/2019 | McLane et al. | |
| 2020/0089556 A1* | 3/2020 | Chen | G06N 3/084 |
| 2020/0097389 A1* | 3/2020 | Smith | G06F 11/3612 |
| 2020/0285737 A1* | 9/2020 | Kraus | G06F 21/552 |
| 2021/0149788 A1* | 5/2021 | Downie | G06F 11/3604 |

* cited by examiner

Event sequence

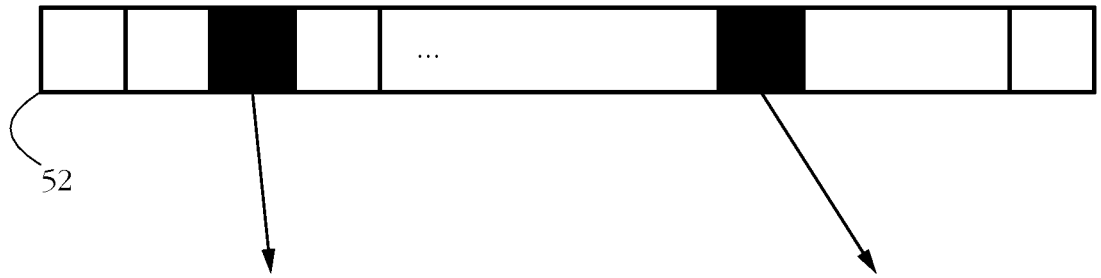

| timestamp | 1547080289775 |
|---|---|
| event_type | FILE_CREATE |
| uuid | 4bc5f8939702e688f1a8 336465df73a03128c5c0 149151aa5189722ede4c 101 |
| pid | 7652 |
| FilePath | \Device\ HarddiskVolume2\ Windows\SysWOW64\ drivers32\mIRC 6.x Serial Generator.exe |
| CreateOptions | 16777312 |
| FileAttributes | 128 |
| ShareAccess | 0 |
| proc_path | C:\storage\file.exe |
| ... | ... |

53a

| timestamp | 1547080292589 |
|---|---|
| event_type | KCBDelete |
| uuid | 8336465df7a4bc5f8939 702e128c5caa51897915 1aa89397025189722ede 453 |
| pid | 7652 |
| KeyName | \REGISTRY\MACHINE\ SOFTWARE\Microsoft\ \Wow64\x86 |
| Status | 0 |
| ... | ... |

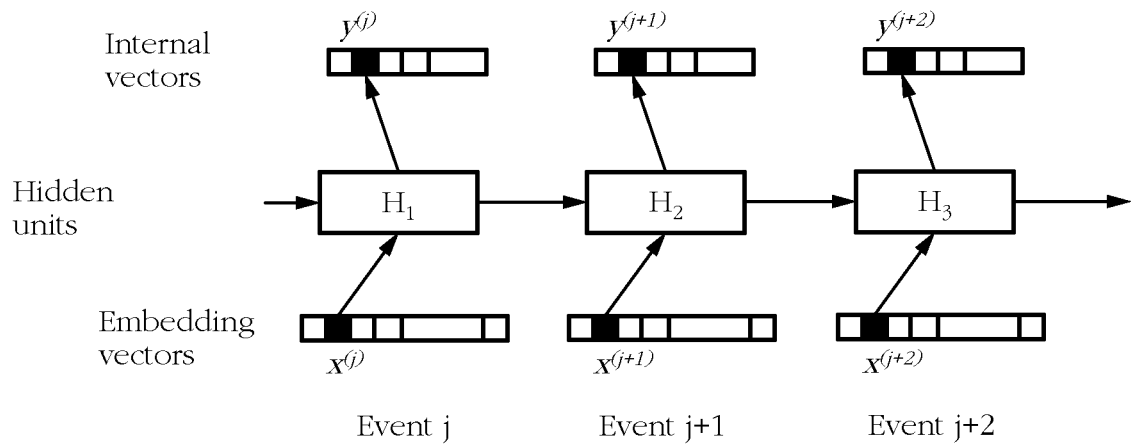
FIG. 10-A
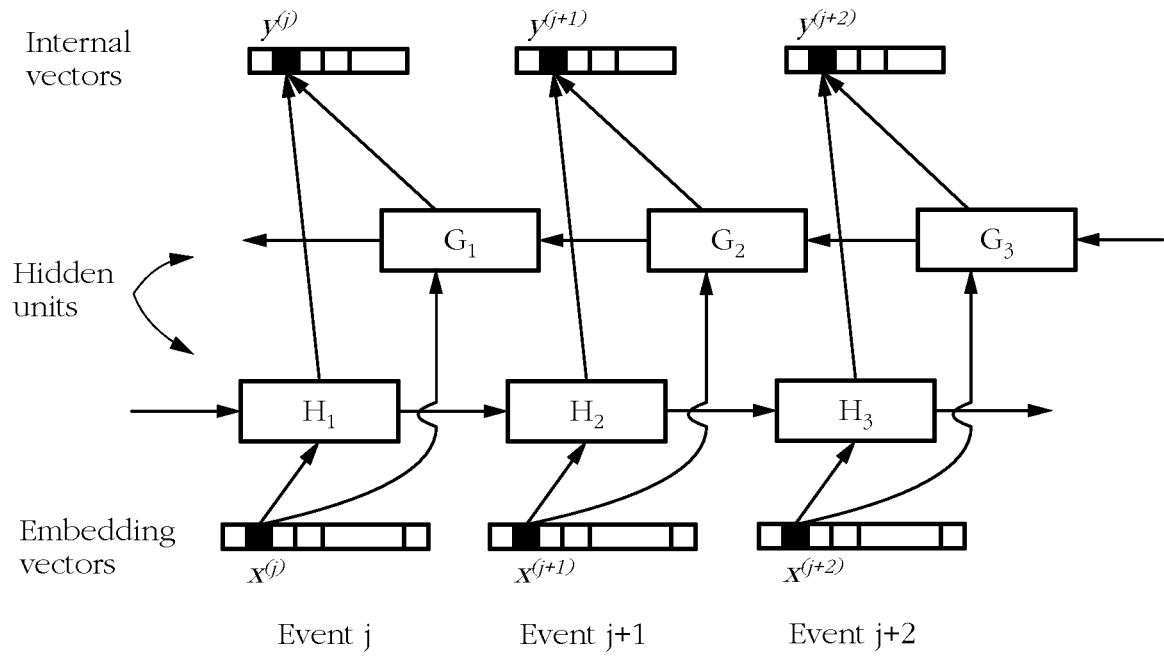
FIG. 10-B

MACHINE LEARNING SYSTEMS AND METHODS FOR REDUCING THE FALSE POSITIVE MALWARE DETECTION RATE

BACKGROUND

The invention relates to computer security systems and methods, and in particular to systems and methods for detecting malicious software and/or an intrusion into a computer system and/or communication network.

In recent years, computer and network security have become increasingly important for private individuals and companies alike. The rapid development of electronic communication technologies, the increasing reliance on software in daily activities, and the advent of the Internet of Things have left companies and individuals vulnerable to loss of privacy, data theft, and ransom attacks.

Malicious software, also known as malware, is one of the main computer security threats affecting computer systems worldwide. In its many forms such as computer viruses, worms, rootkits, and spyware, malware presents a serious risk to millions of computer users. Security software may be used to detect malware infecting a user's computer system, and additionally to remove or stop the execution of such malware. Several malware-detection techniques are known in the art. Some rely on matching a fragment of code of the malware agent to a library of malware-indicative signatures. Other methods detect a set of malware-indicative behaviors of the malware agent.

Such conventional anti-malware strategies typically rely on human analysts to devise explicit malware detection rules and algorithms. For instance, an analyst may use empirical observations and/or insight into the modus operandi of malicious software to devise behavioral heuristics that are subsequently implemented in security software. However, new malware is constantly being created, so such behavior heuristics need to be constantly checked and updated. As the variety of computing devices and the amount of data flowing over information networks increase, it becomes increasingly impractical for human operators to reliably maintain security software. Therefore, there is substantial interest in developing more robust and scalable computer security systems and methods.

A particular problem plaguing computer security is false positive detection, i.e., a situation in which security software falsely interprets some legitimate computing activities as a cyber-attack. Such events may be particularly costly in terms of productivity and may reduce a user's confidence in the respective software solution or even in computer security in general. Therefore, reducing the false positive detection rate may be as important to successful computer security as reliably detecting true threats.

SUMMARY

According to one aspect, a computer system comprises at least one hardware processor configured to execute a behavior analyzer to determine whether a software entity is malicious, and in response, when the behavioral analyzer indicates that the software entity is not malicious, to determine that the software entity is not malicious. The at least one hardware processor is further configured, when the behavioral analyzer indicates that the software entity is malicious, to execute a memory analyzer to determine whether the software entity is malicious. The at least one hardware processor is further configured, when the memory analyzer indicates that the software entity is malicious, to determine that the software entity is malicious, and when the memory analyzer indicates that the software entity is not malicious, to determine that the software entity is not malicious. The behavior analyzer comprises a first neural network configured to receive a sequence of event indicators and to determine whether the software entity is malicious according to the sequence of event indicators. Each event indicator of the sequence characterizes a distinct event caused by an execution of the software entity. The sequence of event indicators is ordered according to a time of occurrence of each distinct event. The memory analyzer comprises a second neural network configured to receive a sequence of token indicators and to determine whether the software entity is malicious according to the sequence of token indicators. Each token indicator of the sequence characterizes a distinct character string token extracted from a memory snapshot of the software entity. The sequence of token indicators is ordered according to a memory location of each respective character string token.

According to another aspect, a malware detection method comprises employing at least one hardware processor of computer system to execute a behavior analyzer to determine whether a software entity is malicious, and in response, when the behavioral analyzer indicates that the software entity is not malicious, to determine that the software entity is not malicious. The method further comprises employing the at least one hardware processor, when the behavioral analyzer indicates that the software entity is malicious, to execute a memory analyzer to determine whether the software entity is malicious. The method further comprises employing the at least one hardware processor, when the memory analyzer indicates that the software entity is malicious, to determine that the software entity is malicious, and when the memory analyzer indicates that the software entity is not malicious, to determine that the software entity is not malicious. The behavior analyzer comprises a first neural network configured to receive a sequence of event indicators and to determine whether the software entity is malicious according to the sequence of event indicators. Each event indicator of the sequence characterizes a distinct event caused by an execution of the software entity. The sequence of event indicators is ordered according to a time of occurrence of each distinct event. The memory analyzer comprises a second neural network configured to receive a sequence of token indicators and to determine whether the software entity is malicious according to the sequence of token indicators. Each token indicator of the sequence characterizes a distinct character string token extracted from a memory snapshot of the software entity. The sequence of token indicators is ordered according to a memory location of each respective character string token.

According to another aspect, a non-transitory computer-readable medium stores instructions which, when executed by at least one hardware processor of a computer system, cause the computer system to execute a behavior analyzer to determine whether a software entity is malicious, and in response, when the behavioral analyzer indicates that the software entity is not malicious, to determine that the software entity is not malicious. The instructions further cause the computer system, when the behavioral analyzer indicates that the software entity is malicious, to execute a memory analyzer to determine whether the software entity is malicious. The instructions further cause the computer system, when the memory analyzer indicates that the software entity is malicious, to determine that the software entity is malicious, and when the memory analyzer indicates that the software entity is not malicious, to determine that the software entity is not malicious. The behavior analyzer comprises a first neural network configured to receive a sequence of event indicators and to determine whether the software entity is malicious according to the sequence of event indicators. Each event indicator of the sequence characterizes a distinct event caused by an execution of the software entity. The sequence of event indicators is ordered according to a time of occurrence of each distinct event. The memory analyzer comprises a second neural network configured to receive a sequence of token indicators and to determine whether the software entity is malicious according to the sequence of token indicators. Each token indicator of the sequence characterizes a distinct character string token extracted from a memory snapshot of the software entity. The sequence of token indicators is ordered according to a memory location of each respective character string token.

BRIEF DESCRIPTION OF THE DRAWINGS

The foregoing aspects and advantages of the present invention will become better understood upon reading the following detailed description and upon reference to the drawings where:

FIG. 5 shows an exemplary event sequence comprising and exemplary event records according to some embodiments of the present invention.

FIG. 10-A illustrates an exemplary uni-directional recurrent neural network according to some embodiments of the present invention.

FIG. 10-B shows an exemplary bi-directional recurrent neural network according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting equipment and data against illegitimate access, modification, and/or destruction. A computer program is a sequence of processor instructions carrying out a task. Computer programs described in some embodiments of the present invention may be stand-alone software entities or sub-entities (e.g., subroutines, libraries) of other computer programs. A process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. A hash is the numerical result of applying a hash function to a token (e.g., character string, code snippet, etc.). Hash functions map data of arbitrary size to fixed-size values. Exemplary hashing functions/procedures include, among others, cyclic redundancy check (CRC), checksums, message digest functions (e.g., MD5), and secure hash algorithms (SHA). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
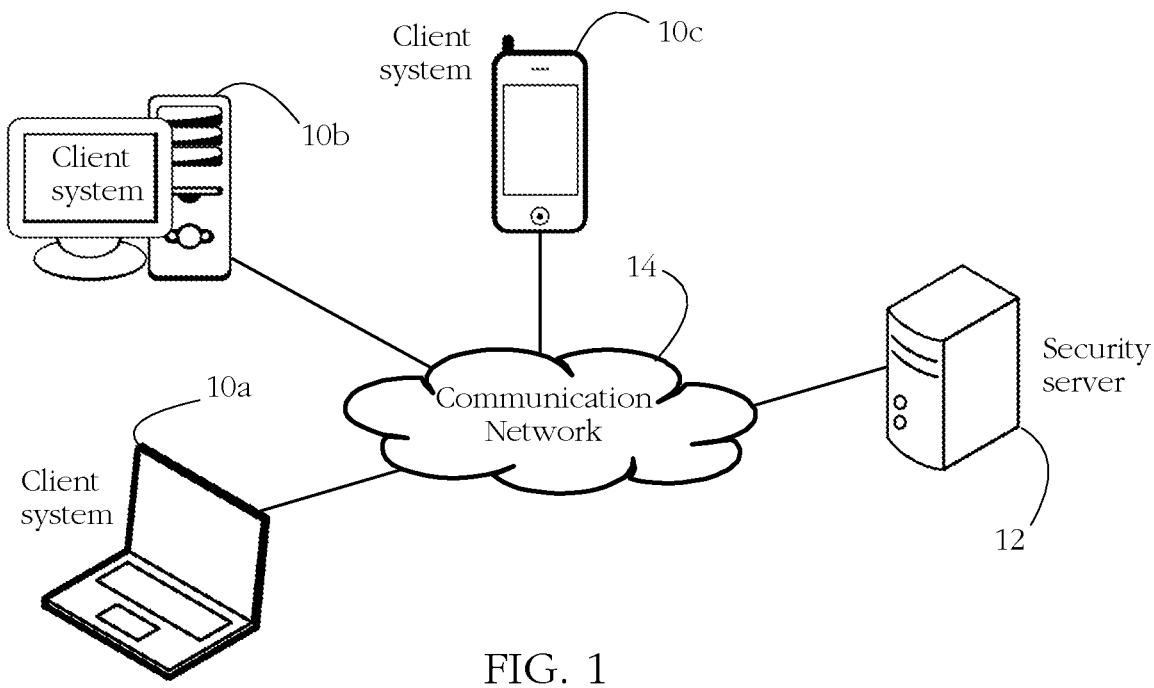
FIG. 1 shows a set of interconnected client systems protected from computer security threats according to some embodiments of the present invention.

FIG. 1 shows an exemplary set of client systems 10a-c protected from computer security threats according to some embodiments of the present invention. Client systems 10a-c generically represent any electronic device having a processor, a memory, and a communication interface. Exemplary client systems 10a-c include personal computers, corporate mainframe computers, servers, laptops, tablet computers, mobile telecommunication devices (e.g., smartphones), media players, TVs, game consoles, home appliances, and wearable devices (e.g., smartwatches), among others.

The illustrated client systems are interconnected by a communication network 14, which may include a local area network (LAN) and/or a wide area network (WAN) such as the Internet. In some embodiments, clients 10a-c are further connected to a security server 12 by way of network 14. Server 12 generically represents a set of communicatively coupled computer systems, which may or may not be in physical proximity to each other. Clients 10a-c are protected against computer security threats (e.g., malware, intrusion) by security software executing on each client system and/or on security server 12, as described in detail below. In some embodiments, such protection comprises security software automatically detecting suspicious activity occurring at a client system, for instance an action of an attacker controlling the respective client system, an attempt by malicious software to extract sensitive information from the respective client, etc.

Figure 2:
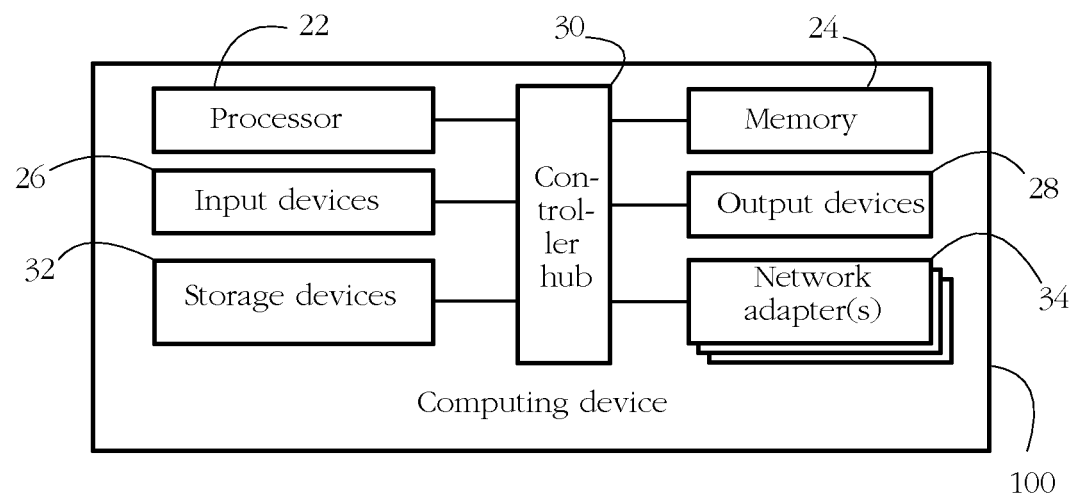
FIG. 2 illustrates an exemplary hardware configuration of a computing device configured to carry out computer security operations according to some embodiments of the present invention.

FIG. 2 shows an exemplary hardware configuration of a computing device 100 configurable to carry out computer security operations as described herein. Device 100 may represent any of client systems 10a-c in FIG. 1, as well as security server 12. For clarity, the illustrated computing device is a personal computer. Other computing devices such as mobile telephones, tablet computers, and wearable devices may have slightly different configurations. A processor 22 comprises a physical device (e.g. microprocessor, multi-core integrated circuit formed on a semiconductor substrate) configured to execute computational and/or logical operations with a set of signals and/or data. Such signals or data may be encoded and delivered to processor 22 in the form of processor instructions, e.g., machine code. A memory unit 24 may comprise volatile computer-readable media (e.g. dynamic random-access memory—DRAM) storing data/signals accessed or generated by processor 22 in the course of carrying out operations.

Input devices 26 may include computer keyboards, mice, and microphones, among others, including the respective hardware interfaces and/or adapters allowing a user to introduce data and/or instructions into device 100. Output devices 28 may include display devices such as monitors and speakers among others, as well as hardware interfaces/adapters such as graphic cards, enabling the respective computing device to communicate data to a user. In some embodiments, input and output devices 26-28 share a common piece of hardware (e.g., a touch screen).

Storage devices 32 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 34 enable computing device 100 to connect to an electronic communication network (e.g., network 14 in FIG. 1) and/or to other devices/computer systems.

Controller hub 30 generically represents the plurality of system, peripheral, and/or chipset buses, and/or all other circuitry enabling the communication between processor 22 and the rest of the hardware components of device 100. For instance, controller hub 30 may comprise a memory controller, an input/output (I/O) controller, and an interrupt controller. Depending on hardware manufacturer, some such controllers may be incorporated into a single integrated circuit, and/or may be integrated with the processor. In another example, controller hub 30 may comprise a northbridge connecting processor 22 to memory 24, and/or a southbridge connecting processor 22 to devices 26, 28, 32, and 34.

Figure 3:
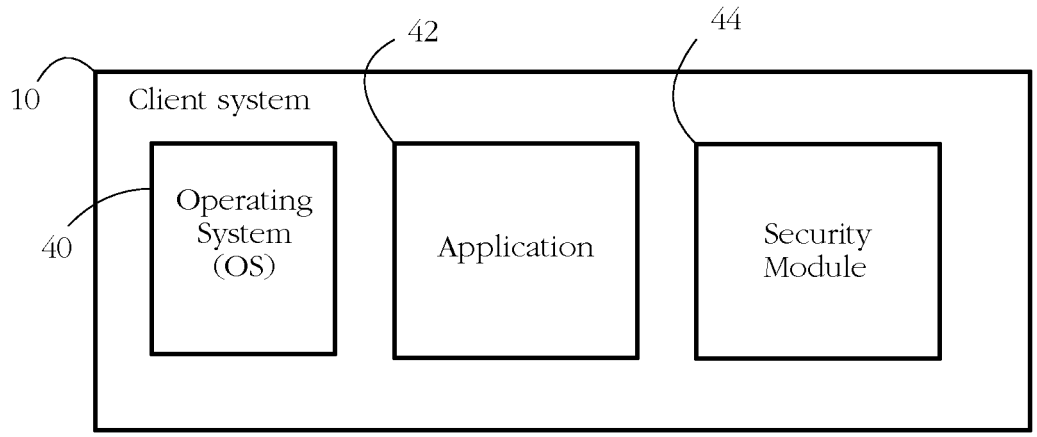
FIG. 3 illustrates exemplary software components executing on a protected client system according to some embodiments of the present invention.

FIG. 3 shows exemplary components of client system 10 (e.g., any of client systems 10a-c in FIG. 1) according to some embodiments of the present invention. Such components may be embodied as software, i.e., computer programs comprising instructions which, when loaded in memory unit 24 and executed by hardware processor 22, cause the processor to carry out the respective tasks or procedures. A skilled artisan will understand that any and/or all illustrated components may also be embodied in hardware, firmware, and/or a combination of the above, and may interact with other components via dedicated drivers and/or interfaces. Loading a component/module onto memory 24 and/or processor 22 is herein referred to as forming or executing the respective component/module.

Client system 10 may execute an operating system (OS) 40 providing an interface between the hardware of client system 10 and other computer programs such as a user application 42 executing on the respective client system. Exemplary operating systems include, among others, Windows®, Linux®, MacOS®, iOS®, and Android®. User application 42 generically represents any computer program such as a word processing, image processing, spreadsheet, calendar, gaming, social media, web browser, and electronic communication application, among others.

In some embodiments, a security module 44 is configured to protect client system 10 against computer security threats such as malicious software and intrusion. Among other functions, security application 44 is configured to detect a set of events occurring during execution of software on client system 10 and determine whether the respective client system is under attack according to the respective detected events. In some embodiments, security module 44 is further configured to determine whether the respective client system is under attack according to a content of a section of memory of the respective client system. In some embodiments, security module 44 comprises an artificial intelligence system such as a set of artificial neural networks pre-trained to differentiate between benign and malicious event sequences and/or between legitimate and malicious memory contents, as described in detail below.

Security module 44 may execute at various levels of processor privilege. For instance, in some embodiments, module 44 executes at user level (also known as ring 3 in some hardware platforms). Some components may execute at a processor privilege level of OS 40 (typically ring 0 or kernel mode). In a hardware virtualization embodiment wherein OS 40 and application 42 execute within a virtual machine (for instance, in a cloud computing environment), module 44 may be configured to protect multiple virtual machines executing on client system 10. In such embodiments, module 44 may execute outside of a protected virtual machine, at a processor privilege level of a hypervisor exposing the respective virtual machine (e.g., ring −1 or VMX root on Intel® platforms), or within a separate, dedicated security virtual machine. To perform operations such as event detection from a position outside of the protected virtual machine, some embodiments may employ a set of procedures known in the art as virtual machine introspection.

Figure 4:
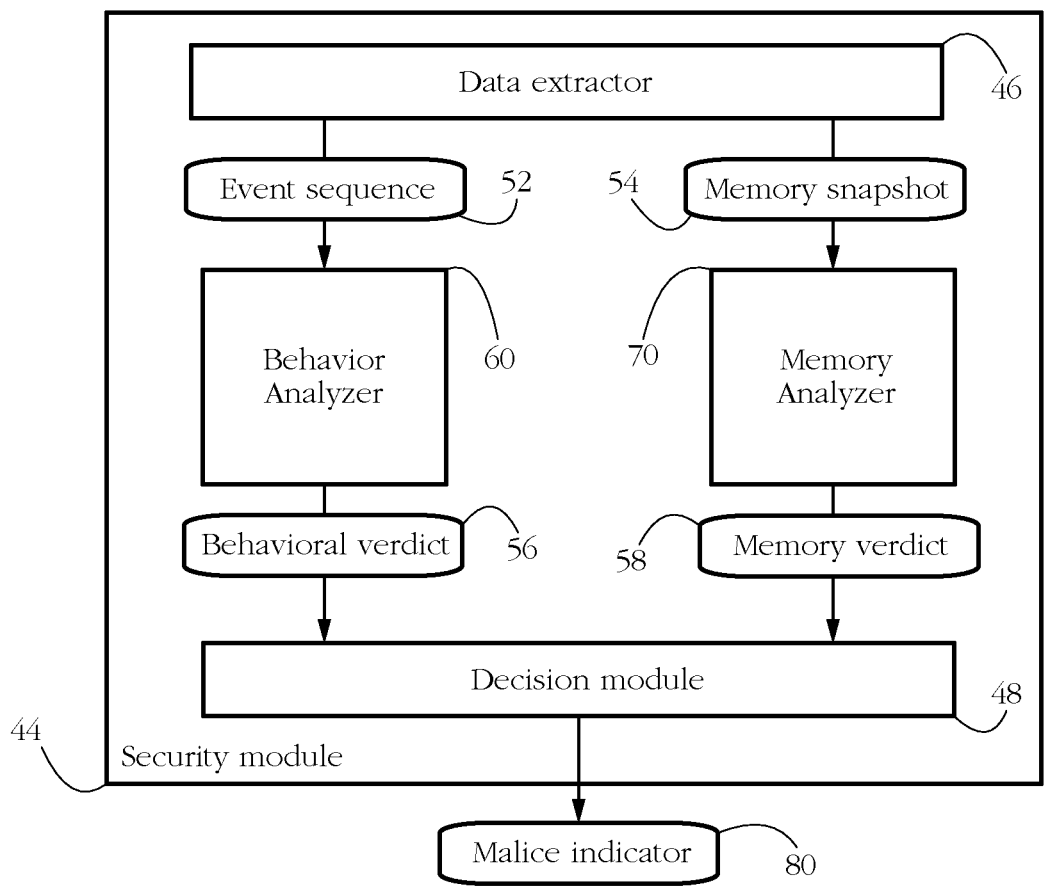
FIG. 4 shows a structural and functional diagram of an exemplary security module according to some embodiments of the present invention.

FIG. 4 illustrates exemplary components of security module 44 according to some embodiments of the present invention. Module 44 comprises a data extractor 46, a behavior analyzer 60 and a memory analyzer 70 receiving input from data extractor 46, and a decision module 48 coupled to analyzers 60 and 70. In some embodiments, security module 44 uses artificial intelligence technology to compute a malice indicator 80 indicating whether the respective client system is currently under attack, for instance whether the respective client system comprises malicious software or is being controlled by a malicious intruder. In a preferred embodiment, analyzers 60 and/or 70 comprise a set of artificial neural networks trained to distinguish between benign and malicious software entities according to a sequence of events caused by execution of a monitored entity, and according to a memory snapshot of the respective monitored entity, respectively. Monitored software entities may vary in scope from individual processes/threads to whole virtual machines.

Data extractor 46 provides input to behavior analyzer 60 and/or memory analyzer 70. In some embodiments, extractor 46 is configured to detect the occurrence of certain events during execution of software on the respective client system. Exemplary detected events include process launches and terminations, the spawning of a child process (e.g., forking), dynamic loading/unloading of a library, execution of a particular processor instruction (e.g., system call), file events such as file creation, write, deletion, etc., and setting various OS parameters (e.g., Windows® registry events), among others. Other exemplary events include an access requests to peripherals (e.g., hard disk, network adapter), a request to access a remote resource (e.g., a hypertext transfer protocol—HTTP request to access a particular URL, an attempt to access a document repository over a local network), a request formulated in a particular uniform resource identifier scheme (e.g., a mailto: or a ftp: request), and an attempt to send an electronic message (e.g., email, short message service—SMS, etc.), among others. Detected events may or may not be indicative of malice per se; some events may be malice-indicative when occurring together with other events and/or when occurring in a particular sequence.

Event detection may comprise any method known in the art. In one example, upon detecting the launch of a process/application (such as user application 42), data extractor 46 registers the respective process with an event logging service of OS 40 (e.g., event tracking for Windows®—ETW, Syslog in UNIX®). In response, extractor 46 may receive notifications of various events occurring during execution of the respective process, either in real time or in log form. Event logging tools typically generate a list of event descriptors including a timestamp for each event, a numerical code identifying an event type, an indicator of a type of process or application that generated the respective event, and other event parameters. In such embodiments, extractor 46 may detect the occurrence of a target event by parsing the respective event log.

In another example of event detection, data extractor 46 may modify a set of native functions of OS 40 by inserting redirecting instructions (also known as hooks or patches). In this manner, when a process executing on client system 10 calls the respective OS function, execution is redirected to a callback routine notifying extractor 46 about an attempt to execute the respective OS function. When the hooked function is instrumental in a monitored event (e.g., file creation, process launch, etc.), an attempt to call the respective function may serve as an indicator of the occurrence of the respective event.

In yet another example particularly suited to a hardware virtualization embodiment, data extractor 46 may modify an access permission of a memory page hosting a targeted OS function, for instance to indicate that the respective memory page is not executable. An attempt to execute the respective OS function will then trigger a processor exception (e.g., page fault). Extractor 46 may further register as an exception handler, so that the attempt to execute the target OS function will automatically notify data extractor 46. Such a notification may in turn indicate the occurrence of the target event.

Data extractor 46 may organize detected events into an event sequence according to a time of occurrence of each event and/or according to the software entity that caused the respective event. In one example, the event sequence is assembled exclusively from events caused by the execution of the same software entity identified for instance by its unique identifier (e.g., process id—PID) assigned by OS 40. In an alternative embodiment, the event sequence may have events caused by the execution of a group of related software entities, for instance members of the same software suite, entities related to each other by filiation (parent-child), or entities that share a common characteristic such as proc_path or FilePath key values in Windows®. Within the sequence, individual events may be arranged in the order of the time of occurrence.

An exemplary event sequence 52 is illustrated in FIG. 5, wherein each event is represented by a corresponding event record. An exemplary record 53a represents a file creation event, while another exemplary record 53b represents a Windows® registry edit. Each event record may comprise a set of characteristic features of the respective event, such as a time of occurrence (e.g., timestamp), an event type, a unique identifier of the respective event (e.g., hash, uuid), an identifier of the software entity which caused the respective event (e.g., process ID—pid), a location indicator (e.g., file path, proc_path) of the respective entity, and various event-specific parameter values. Event records may be encoded using any method knows in the art, for instance as attribute-value pairs specified in a version of an extensible markup language (XML) or Javascript object notation (JSON), among others.

Some embodiments of data extractor 46 further processes event sequence 52 by representing each event of the sequence as a numerical code uniquely identifying an event type (e.g., file creation, registry write, HTTP request, etc.) of the respective event. In such embodiments, event sequence 52 may thus be represented as an ordered sequence of numbers. Another exemplary embodiment tracks a subset of $N_E$ distinct event types (herein known as an event vocabulary) and each event is represented as a $N_E \times 1$ Boolean vector, wherein each line represents a distinct event type and the value of the respective element (0 or 1) indicates whether the respective event is of the respective type or not. Events of a type not included in the event vocabulary may be ignored or replaced by a generic placeholder (e.g., "others"). Such a representation is typically known as a one-hot encoding. In such embodiments, the entire event sequence 52 may be represented as an $N_E \times M_E$ array wherein $M_E$ denotes the number of events in sequence 52, each column represents a distinct event, and columns are ordered according to a timestamp of each event. A skilled artisan will appreciate that many alternative event encodings may be used in a similar manner without departing from the scope of the present description, and therefore the illustrative one-hot encoding shown herein is not limiting.

The size $N_E$ and/or the composition of the event vocabulary may be chosen according to a result of experimentation, for instance running behavior classifier 60 with several distinct choices of vocabulary and comparing results in terms of performance metrics (accuracy, detection rate, and/or false-positive rate, the amount of computing resources consumed, etc.). The composition of the event vocabulary (i.e., choice of monitored event types) may be further selected according to ease of detection, frequency of occurrence, and relevance to security of each distinct event type. In one example, the event vocabulary comprises n % most frequently occurring event types, further filtered to remove events types which are not considered relevant to computer security, wherein n is in the range of 1 to 10.

In one particular example, each distinct item of the event vocabulary represents a distinct event type (e.g., file creation, registry write, DLL load etc.). Stated otherwise, two file creation events with distinct file names/paths are represented as a single vocabulary item. In such embodiments, $N_E$ values may vary between 20 and 50, with a typical value of 36 for clients executing a Windows® operating system. In another example, vocabulary items are tuples created by pairing an event type (e.g., file creation) with other characteristics of the respective event (e.g., a file name or path in the case of a file creation event). In such embodiments, two file creation events with distinct file names/paths are represented as two distinct event vocabulary items. Some examples of such characteristic tuples are shown below:
'DIR_ENUM': ['FileName'],
'FILE_CLOSE': ['FilePath'],
'FILE_CREATE': ['FilePath','CreateOptions'],
'FILE_SET_PROPERTIES': ['FilePath'],
'FILE_WRITE': ['FilePath'],
'KCBCreate': ['KeyPath', 'KeyName'],
'KCBDelete': ['KeyPath', 'KeyName'],
'REGISTRY_SET_VALUE': ['KeyPath', 'KeyName'],
'IMAGE_LOAD': ['FileName'],
'IMAGE_UNLOAD': ['FileName']
'PROCESS_CREATE': ['CommandLine', 'ExitStatus', 'Flags', 'Image', 'ImageFileName', 'PackageFullName', 'ParentCommandLine', 'ParentImage'],
'PROCESS_TERMINATE': ['CommandLine', 'ImageFileName', 'Flags', 'ExitStatus']
In such embodiments, $N_E$ values are typically of the order of a hundred thousand to a few million.

In some embodiments, behavior analyzer 60 receives event sequence 52 and outputs a behavioral verdict 56 indicating whether the software entity that caused the respective sequence of events is malicious. In some embodiments, behavioral verdict 56 includes an indicator of a likelihood of malice (e.g., a numerical probability, a value on a pre-determined scale, etc.), or an indicator of a category selected from a pre-determined set of malice-characterizing categories (e.g., low/medium/high likelihood, clean/infected/unknown, etc.).

Figure 6:
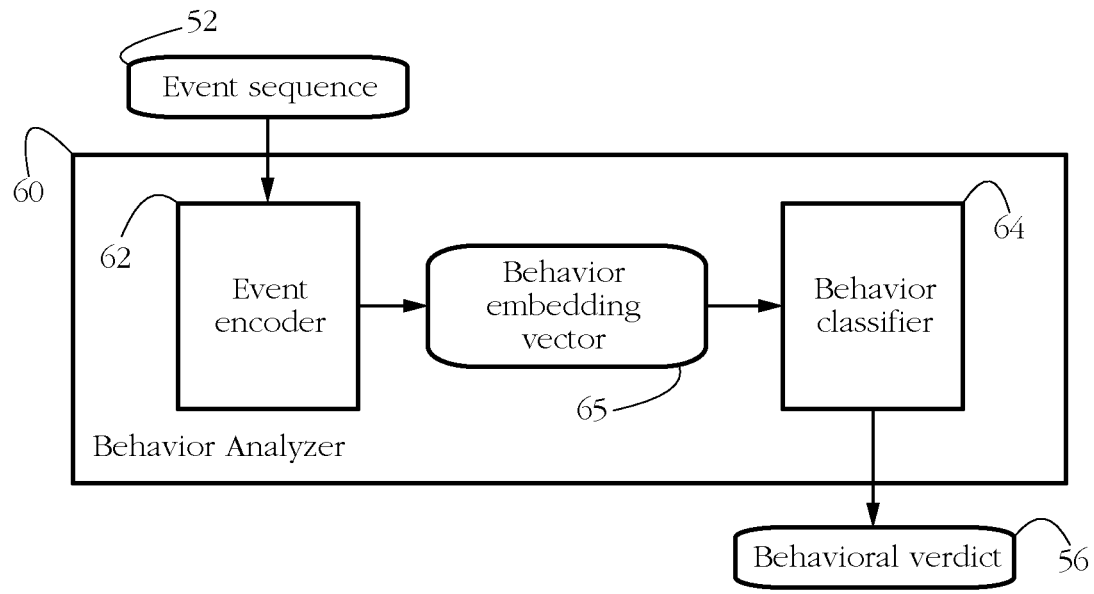
FIG. 6 shows exemplary components of a behavioral analyzer according to some embodiments of the present invention.

FIG. 6 shows exemplary components of behavior analyzer 60 according to some embodiments of the present invention. Analyzer 60 may include an event encoder 62 and a behavior classifier 64 coupled to event encoder 62. In a preferred embodiment, encoder 62 and classifier 64 comprise pre-trained artificial neural networks.

Figure 7:
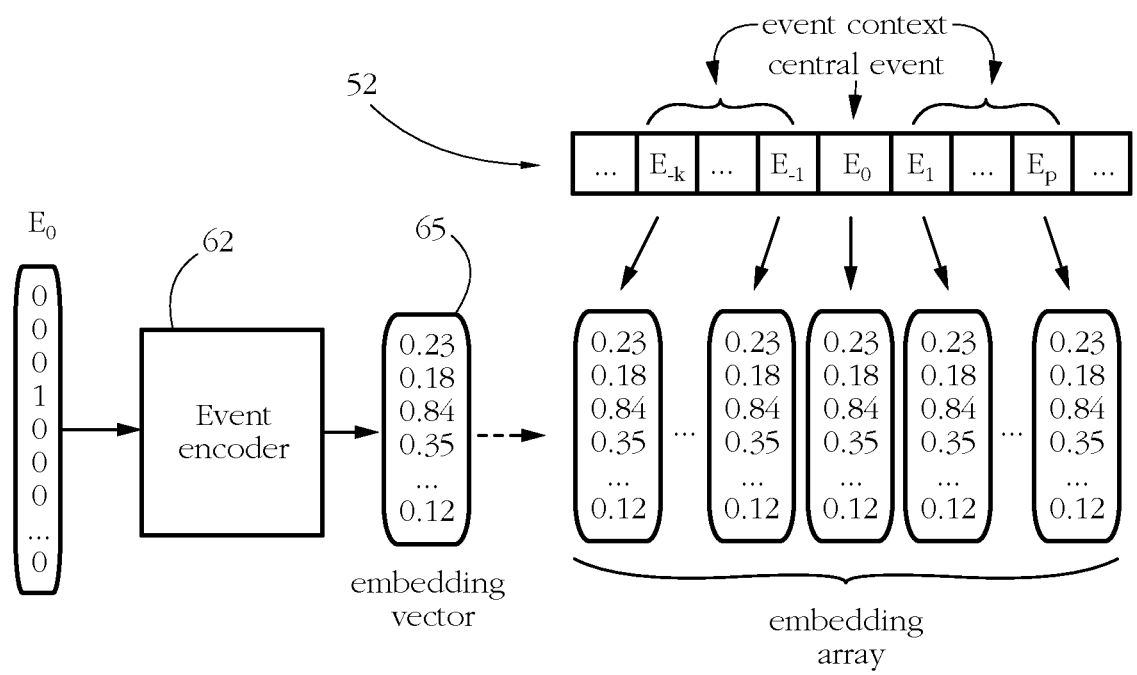
FIG. 7 illustrates an exemplary behavior embedding array comprising multiple event embedding vectors according to some embodiments of the present invention.

FIG. 7 illustrates an exemplary operation of event encoder 62 according to some embodiments of the present invention. Event encoder 62 is configured, for each event of sequence 52 herein represented by one-hot vector $E_0$, to determine an embedding vector 65 comprising a representation of the respective event in an abstract multi-dimensional space deemed an embedding space. An exemplary event embedding space is spanned by a set of axes, wherein each axis represents a distinct event feature or a combination of event features (e.g., a principal component of the event feature space). Some embodiments choose the dimensionality of the embedding space according to a size of the event vocabulary $N_E$, i.e., the count of distinct event types that security module 44 is monitoring. For instance, the dimensionality of the event embedding space may of the order of the quadratic root of $N_E$, or of a logarithm of $N_E$. A typical dimensionality according to some embodiments is of the order of several hundred (e.g., 100 or 300 dimensions).

In preferred embodiments, individual events are not analyzed in isolation, but instead in the context of other events, and embedding vector 65 inhabits an embedding space of contexts wherein two events that occur predominantly in similar contexts are located relatively close together. Stated otherwise, two events that frequently occur together are separated in the embedding space by a distance smaller than the distance between two events which occur predominantly in different contexts. FIG. 7 illustrates an exemplary event sequence 52 comprising central event $E_0$ and an exemplary event context consisting of a subset of events $E_{-k} \ldots E_{-1}$ ($k \geq 1$) preceding the central event and/or a subset of events $E_1 \ldots E_p$ ($p \geq 1$) following the central event according to their associated timestamp. Typical embodiments use a symmetric event context (p=k), with p in the range of 2 to 5.

In a preferred embodiment, event encoder 62 comprises an artificial intelligence system, for instance a multilayer artificial neural network (e.g., a recurrent and/or feed-forward neural network). To achieve the desired representation of event vectors, parameters of encoder 62 may to be tuned until some performance condition is satisfied. Such tuning is herein referred to as training. In a neural network embodiment, exemplary tunable parameters of event encoder 62 include a set of synapse weights and activation biases, among others. In some embodiments, training event encoder 62 amounts to constructing the embedding space itself. Stated otherwise, the embedding space is not pre-determined, but instead depends on the composition of the training event corpus and on the selected training procedure. Exemplary training procedures include versions of the word2vec algorithm (such as a skip-gram algorithm and a continuous bag-of-words algorithm,) as well as versions of the GloVe algorithm. More details on training are given below, in relation to FIGS. 15-16.

In some embodiments, embedding vector(s) 65 produced by trained event encoder 62 are further fed to behavior classifier 64, which in turn outputs a behavioral verdict 56 determined according to event embedding vector(s) 65. An exemplary verdict 56 comprises a label (e.g., benign/malicious/unknown). In another example, behavior verdict 56 comprises a number indicative of a likelihood/probability that the respective monitored entity is malicious.

In some embodiments, behavior classifier 64 comprises a set of interconnected artificial neural networks trained to discern between benign and malicious behaviors according to event sequences 52. To accurately discern between malicious and benign behaviors, classifier 64 is pre-trained on a corpus of exemplary event sequences extracted from malicious and/or benign samples. More training details are given below.

Figure 8:
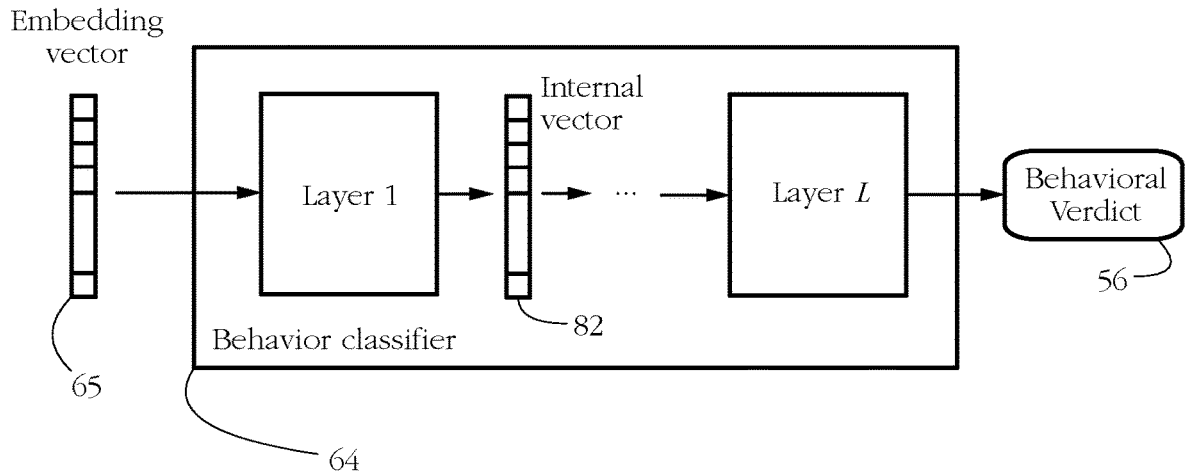
FIG. 8 illustrates an exemplary structure and operation of a behavior classifier according to some embodiments of the present invention.

An exemplary architecture of classifier 64 is illustrated in FIG. 8 and comprises a stack of layers/neural network modules, each layer receiving the output of the previous layer/module and providing input to the next layer of the stack. Each consecutive layer transforms the input received from the previous layer according to a set of pre-set network parameters (e.g., activations, weights, biases) specific to the respective layer, to produce an internal representation of embedding vector 65, herein deemed internal vector (illustrated as item 82 in FIG. 8). The size and range of values of internal vector(s) 82 may vary among the distinct layers/modules of classifier 64. For instance, some layers achieve a dimensionality reduction of the respective input vector, as in the case of a pooling or loss layer.

In a preferred embodiment, behavior classifier 64 comprises a convolutional neural network (CNN) layer followed by a dense (i.e., fully connected) layer further coupled to a rectified linear unit (ReLU) and/or a loss layer. Alternative embodiments comprise a CNN layer further feeding into a recurrent neural network (RNN), followed by fully connected and ReLU/loss layers. In yet another exemplary embodiment, classifier 64 lacks a CNN module, instead comprising a RNN further feeding into a fully connected layer and ReLU/loss layers that ultimately produce verdict 56.

Figure 9:
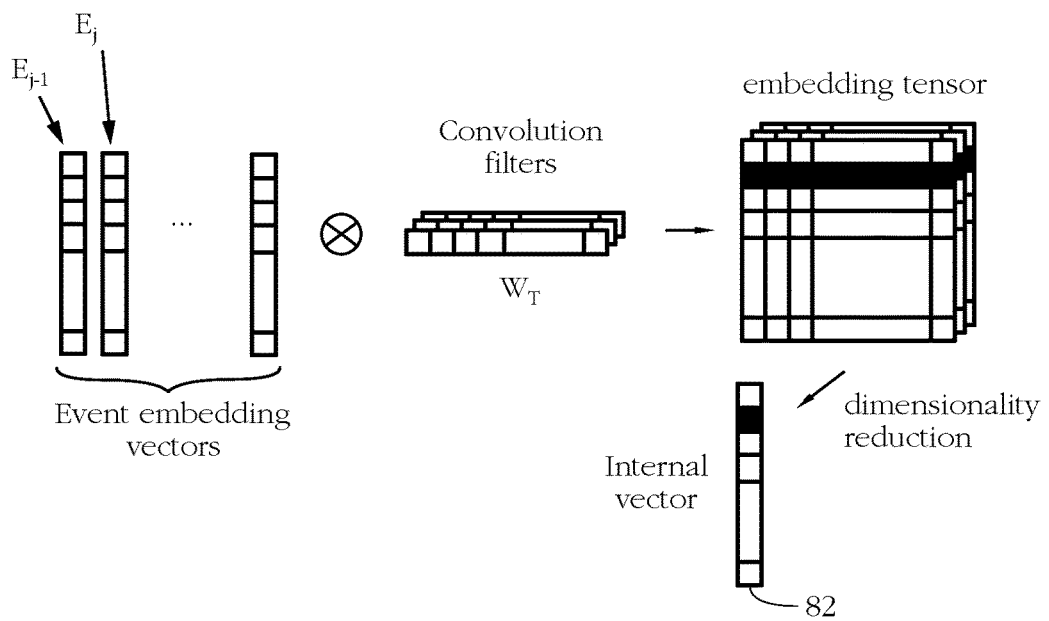
FIG. 9 shows the operation of an exemplary convolutional neural network forming part of a behavior classifier according to some embodiments of the present invention.

The operation of an exemplary convolutional neural network is illustrated in FIG. 9. In some embodiments, the CNN takes an array of event embedding vectors 65 (see e.g., embedding array in FIG. 6) as input. Within the array, embedding vectors 65 are ordered in sequence according to a time of occurrence of the respective events. Convolution effectively multiplies embedding vector(s) 65 with a matrix of weights (commonly known in the art of machine learning as filters) to produce an embedding tensor. Weights of the respective convolutional layers may be adjusted in a training procedure. Convolution itself amounts to performing multiple dot products between elements of embedding vector(s) 65 and each convolution filter. In the illustration of FIG. 9, each filter produces a distinct 2-dimensional slice of the embedding tensor; such slices are stacked in the order of application of the convolution filters. Within each slice i, each element $T_{ij}$ of the embedding tensor has contributions from event j, but also contributions from adjacent events j−1, j+1, etc. The embedding tensor therefore collectively represents event sequence 52 at a granularity that is coarser than that of individual events. In some embodiments, convolution filters have a limited effective receptive field of size r, i.e., all filter elements are zero with the exception of r adjacent elements. When such a filter is applied as illustrated in FIG. 9, each element of the respective slice of the embedding tensor contains contributions from r consecutive events and/or r adjacent elements of embedding vector 65. Typical r values according to some embodiments of the present invention are in the range of 1 to 5, and may vary among convolution filters.

In some embodiments, a CNN layer is followed by a pooling layer which reduces the dimensionality of the embedding tensor by replacing a whole group of adjacent elements of the embedding tensor with a single number computed according to the respective group. Exemplary pooling strategies include max-pooling, wherein each group of values is replaced by the largest value of the group, and average pooling wherein each group of values is replaced by the average of the group values. A typical length of the resulting internal vector(s) 82 according to some embodiments is of the order of several hundred (e.g., 100 or 300.) Application of pooling and/or other dimensionality reduction procedures further ensures that each element internal vector 82 characterizes extracted event sequence 52 at a granularity that is coarser than that of individual events.

Recurrent neural networks (RNN) form a special class of artificial neural networks, wherein connections between the network nodes form a directed graph. FIG. 10-A schematically illustrates an exemplary unidirectional RNN according to some embodiments of the present invention. The illustrated RNN comprises a set of hidden units (e.g., individual neurons) $H_1$, $H_2$, etc., and is configured to receive a sequence of input vectors and in response, to produce another sequence of output vectors, so that each output vector corresponds to a distinct input vector. In the explicit example in FIG. 10-A, each of the sequence of internal vectors corresponds to a distinct embedding vector 65. The topology of the RNN is specifically configured so that each hidden unit $H_j$ receives an input characterizing an event $E_j$, but also an input provided by an adjacent hidden unit $H_{j-1}$, which in turn receives an input characterizing an event $E_{j-1}$ preceding event $E_j$ within the respective event sequence. As a result, the output of hidden unit $H_j$ is influenced not only by the current event $E_j$, but also by the preceding event $E_{j-1}$. Stated otherwise, the illustrated RNN processes information about the current event in the context of previous event(s).

FIG. 10-B illustrates a bi-directional RNN according to some embodiments of the present invention. In contrast to the example of FIG. 10-A, the bi-directional RNN has an extra set of hidden units $G_1$, $G_2$, etc., and a topology that ensures that each hidden unit $G_j$ receives an input characterizing event $E_j$, but also an input provided by an adjacent hidden unit $G_{j+1}$, which in turn receives an input characterizing an event $E_{j+1}$ following event $E_j$ within the respective event sequence. The output of hidden unit $H_j$ is then combined with the output of hidden unit $G_j$, so that the bi-directional RNN processes information about the current event in the context of both previous and subsequent event(s).

Multiple RNN architectures are known in the art. In embodiments of the present invention, RNN layers of behavior classifier 64 may be implemented, for instance, using a long-short-term-memory (LSTM) architecture and/or a graph neural net (GNN) architecture. In one such example, the RNN comprises multiple stacked LSTM networks (e.g., 2-4 layers). Some or all LSTM networks may be bi-directional. In some embodiments, the RNN layer(s) output a prediction vector determined according to the sequence of event embedding vectors 65. The prediction vector may then be fed to a fully connected layer, which in turn computes behavioral verdict 56 indicating whether event sequence 52 is malicious or not.

In some embodiments, memory analyzer 70 (FIG. 4) is configured to receive a memory snapshot 54 from data extractor 46 and to output a memory verdict 58 indicative of whether a software entity having the respective memory snapshot is malicious. Memory verdict 58 may comprise a label (e.g., benign/malicious/unknown) and/or a number indicative of a likelihood that the respective software entity is malicious.

Figure 11:
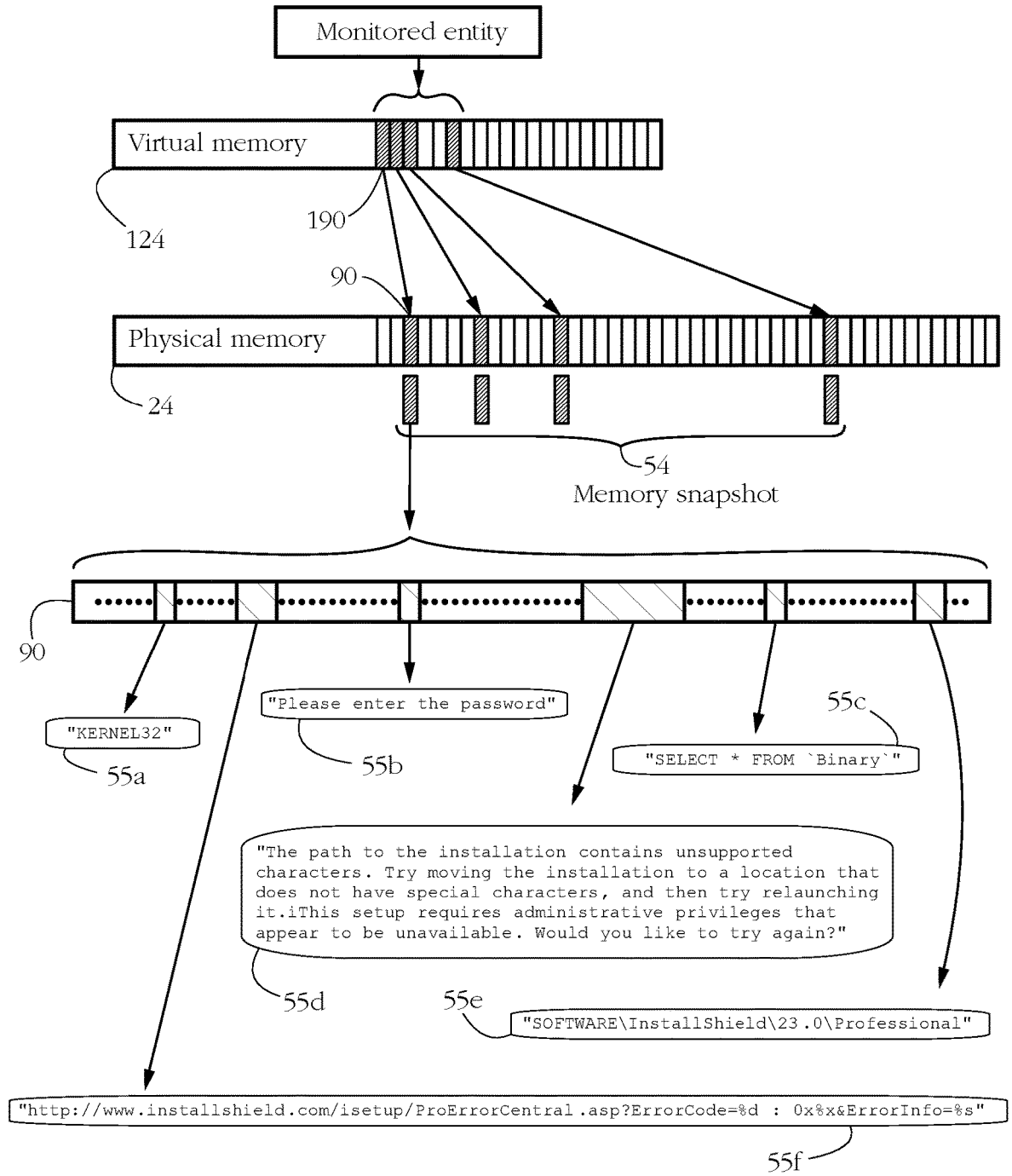
FIG. 11 shows an exemplary memory snapshot comprising a plurality of character string tokens according to some embodiments of the present invention.

FIG. 11 shows an exemplary memory snapshot according to some embodiments of the present invention. Modern computing systems typically work with virtual memory, i.e., an abstraction of the actual physical memory 24. Typically, each software entity executing on the respective computing system is assigned a virtual memory space, with parts of said space mapped to addresses within physical memory 24 and/or physical storage devices 32. In hardware platforms that support paging, physical memory 24 is divided into units commonly known as pages, and mapping between physical and virtual memory is done with page granularity. In the example of FIG. 11, a monitored software entity (e.g., a process executing on client system 10) is assigned a virtual memory space 124, and subsequently accesses physical memory 24 via virtual addresses also known in the art as logical addresses. A virtual memory page 190 within space 124 is mapped to a physical page 90 within actual memory 24. Such mapping effectively comprises a memory address translation from virtual to physical addresses. When the monitored entity attempts to access a content of page 190, an address of page 190 is translated by the processor into an address of a page 90 within physical memory 24 according to page tables typically configured and controlled by guest OS 40. In hardware virtualization platforms, when the monitored entity executes within a virtual machine, processor 22 typically performs an additional address translation from a virtual memory space assigned to the respective virtual machine to actual memory 24. Such translations are implemented via a mechanism known as second level address translation (SLAT), for instance extended page tables (EPT) on Intel® platforms.

In some embodiments, memory snapshot 54 comprises a copy of a content of a set of memory pages used by the respective monitored entity. A page is used by a software entity when it currently contains code and/or data of the respective entity. Snapshot 54 may comprise the content of whole page (i.e., all data currently stored within the respective page) or strictly the data belonging to the respective entity within the respective memory page. An exemplary snapshot of an OS kernel may include, among others, a copy of the kernel's code and data sections, various in-memory kernel drivers (code and/or data sections), in-memory kernel threads and their corresponding stacks, the OS's kernel data structures—such as the list of loaded modules, the list of processes, etc. An exemplary snapshot of application 42 may comprise a copy of a memory image of application 42, including its code and data sections, the in-memory stacks used by the application's threads, and the heap memory pages of application 42, among others.

Some embodiments construct memory snapshot 54 of a monitored entity (e.g., process) according to a content of an executable file/binary image of the respective entity. The executable file comprises processor instructions for executing the respective entity, which are stored on non-volatile media (e.g., storage devices 32 in FIG. 2). In systems running Windows®, exemplary executable files include files having the extensions EXE, SYS, and DLL, among others. Executable files are structured according to a platform-specific format such as the Microsoft® portable executable (PE) and the Executable and Linkable Format (ELF) used by the Linux® family of operating systems. Executable files typically comprise a header, a set of code sections comprising a binary encoding of executable code, and a set of non-code sections comprising various non-executable data of the respective software entity. When the respective entity is launched into execution, the content of the header and code sections, as well as the content of some non-code sections, are loaded into memory at various addresses of the virtual memory space set up by the operating system for the respective process. The header of the executable file typically stores metadata indicating, among others, a size and memory offset of the various code and non-code sections of the respective entity. For instance, header metadata may list the various sections in a specific order.

Some embodiments of the present invention detect the launch of the monitored entity and in response, suspend execution of the respective entity at a point following the loading of the executable file into memory, to determine a memory location of various data/code sections. For instance, some embodiments may identify a memory page storing the header metadata of the respective executable and use such metadata to further identify all memory pages storing code and/or data of the respective entity, before allowing execution of the respective entity to resume. When later called to extract memory snapshot 54, some embodiments read and concatenate the contents of the respective memory pages in an order indicated in the header metadata of the respective monitored entity.

To extract memory snapshot 54, some embodiments collaborate with OS 40 to obtain information such as an address of a page table used by OS 40 to perform address translations for each monitored entity. Some embodiments further suspend execution of the monitored entity for the duration of harvesting memory snapshot 54, to ensure consistency of the extracted memory content. Some embodiments may further trigger page fault(s) to ensure that all required content is currently in memory, i.e., is not paged out to non-volatile storage 32. When the monitored entity executes within a virtual machine, while data extractor 46 executes outside the respective virtual machine, some embodiments employ memory introspection techniques to determine which memory pages contain code/data belonging to the monitored entity. Such techniques may include parsing various data structures (such as the executive process block, or EPROCESS in Windows®) used by OS 40 to manage execution of the monitored entity. An alternative embodiment may insert a software agent into the respective virtual machine, the agent configured to locate the content of memory snapshot 54 and to communicate an indication of the respective memory location to data extractor 46.

Figure 12:
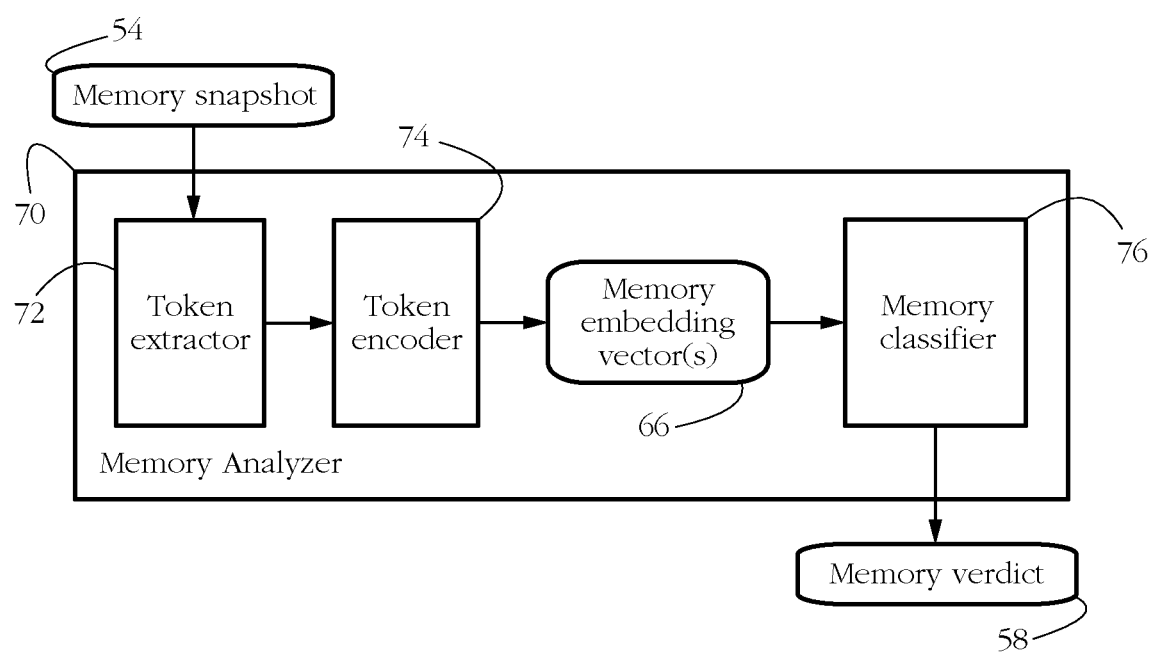
FIG. 12 shows exemplary components of a memory analyzer according to some embodiments of the present invention.

FIG. 12 shows exemplary components of memory analyzer 70 according to some embodiments of the present invention. The illustrated memory analyzer 70 comprises a token extractor 72 connected to a token encoder 74, and a memory classifier 76 connected to token encoder 74.

Classifier 76 is configured to determine whether the software entity having memory snapshot 54 is malicious according to a set of characteristic features of the respective memory snapshot. In some embodiments, such features include a set of tokens present within memory snapshot 54. In a preferred embodiment, tokens consist of character strings (e.g., library names, function names, names of various code and non-code sections of the respective executable file, snippets of text such as messages displayed at runtime, various URLs or other addresses of remote resources used by the respective software entity, etc.), but this aspect of the present invention is not meant to be limiting. Exemplary character string tokens 55*a-f* are illustrated in FIG. 11. A skilled artisan will appreciate that other tokens (e.g., snippets of code, opcodes, PE section flags, etc.) may be similarly extracted from memory snapshot 54 and used to assess malice.

In some embodiments, token extractor 72 is configured to parse memory snapshot 54 and extract a set of character strings, for example by looking for values that are consistent with the to format and range of the American Standard Code for Information Exchange (ASCII) or Unicode encodings of printable characters (letters/glyphs, digits, punctuation, etc.) and copying the respective values from snapshot 54. In another example, token extractor 72 may parse snapshot 54 for a set of pre-determined token delimiters (e.g., specific control values or characters), and identify the content of snapshot 54 located between consecutive delimiters as one token. Some embodiments may break multi-word character strings into individual word tokens. In some embodiments, token extractor 72 may further arrange extracted tokens in sequence according to some criterion, for instance by grouping together tokens of the same kind, or by concatenating the extracted tokens in sequence according to their respective location within snapshot 54, e.g., in order of increasing memory address. Some embodiments arrange tokens in sequence preserving the relative position of tokens as found in the binary image of the respective monitored entity (e.g., as indicated in the executable file of the monitored entity.)

In some embodiments, for each extracted token sequence, encoder 74 produces a memory embedding vector 66 comprising a representation of respective token sequence in an abstract space herein deemed memory embedding space. Some embodiments first determine a memory feature vector of the respective token sequence, wherein each token in the respective sequence is replaced by a numerical label. One exemplary way of determining such a memory feature vector comprises replacing each token by a hash of the respective token. Another exemplary memory feature vector may be constructed according to an ordered vocabulary of tokens of size $N_T$, which may consist of the $N_T$ unique tokens most frequently found in a training corpus of memory snapshots/token sequences extracted from various software samples. An alternative token vocabulary may consist of $N_T$ distinct tokens that most efficiently distinguish between benign and malicious software entity according to testing. Each token in the vocabulary may receive a unique numerical label, indicating for instance a position of the respective token within the vocabulary. Computing the memory feature vector may then comprise looking up each member of the token sequence in the token vocabulary and replacing it with the respective label. In some embodiments, tokens which are not present in the vocabulary are discarded from the sequence or replaced by a generic placeholder (e.g., "others"). A typical size $N_T$ of the token vocabulary is of the order of a hundred thousand to a few million distinct tokens.

In a preferred embodiment, token encoder 74 my represent each token of memory snapshot 54 as a $N_T$-by-1 one-hot vector. Snapshot 54 may then be represented as an array of vectors wherein individual vectors are ordered according to a position of the respective token within snapshot 54. Similarly to event encoder 62, token encoder 74 may further analyze each memory token in the context of other memory tokens that either precede or follow the respective token within memory snapshot 54. In such embodiments, for each token, encoder 74 may determine an embedding vector 66 spanning a space of memory contexts wherein two tokens that occur predominantly in similar memory contexts are located relatively close together. Such a representation may be achieved, for instance, by a token encoder that includes a neural network trained according to a word2vec or a GloVe algorithm (see training details below.)

In some embodiments, memory classifier 76 is configured to receive memory embedding vector(s) 66 and to determine memory verdict 58 according to embedding vector(s) 66. Classifier 76 may include a set of artificial neural networks trained to discern between malicious and benign software entities according to their respective memory embedding vectors. An exemplary architecture of classifier 76 may mirror the one of behavior classifier 64 detailed above. For instance, memory classifier may comprise a CNN feeding a fully connected layer followed by a ReLU and/or loss layer. In such embodiments, the CNN may compute a representation of memory snapshot 54 at a granularity coarser than that of individual memory tokens, by combining information from each token with information from a set of neighboring tokens (i.e., tokens located in the vicinity of the respective token within memory snapshot 54.) In an alternative embodiment, the output of the CNN is first fed to a RNN (e.g., an LSTM network), the output of which is then fed to the fully connected layer which effectively produces verdict 58. In some embodiments, the input to the RNN is arranged according to a location of each token within memory snapshot 54, thus preserving token ordering. By virtue of their particular architecture, RNN layers of memory classifier 76 analyze each token in the context of neighboring tokens of memory snapshot 54.

Figure 13:
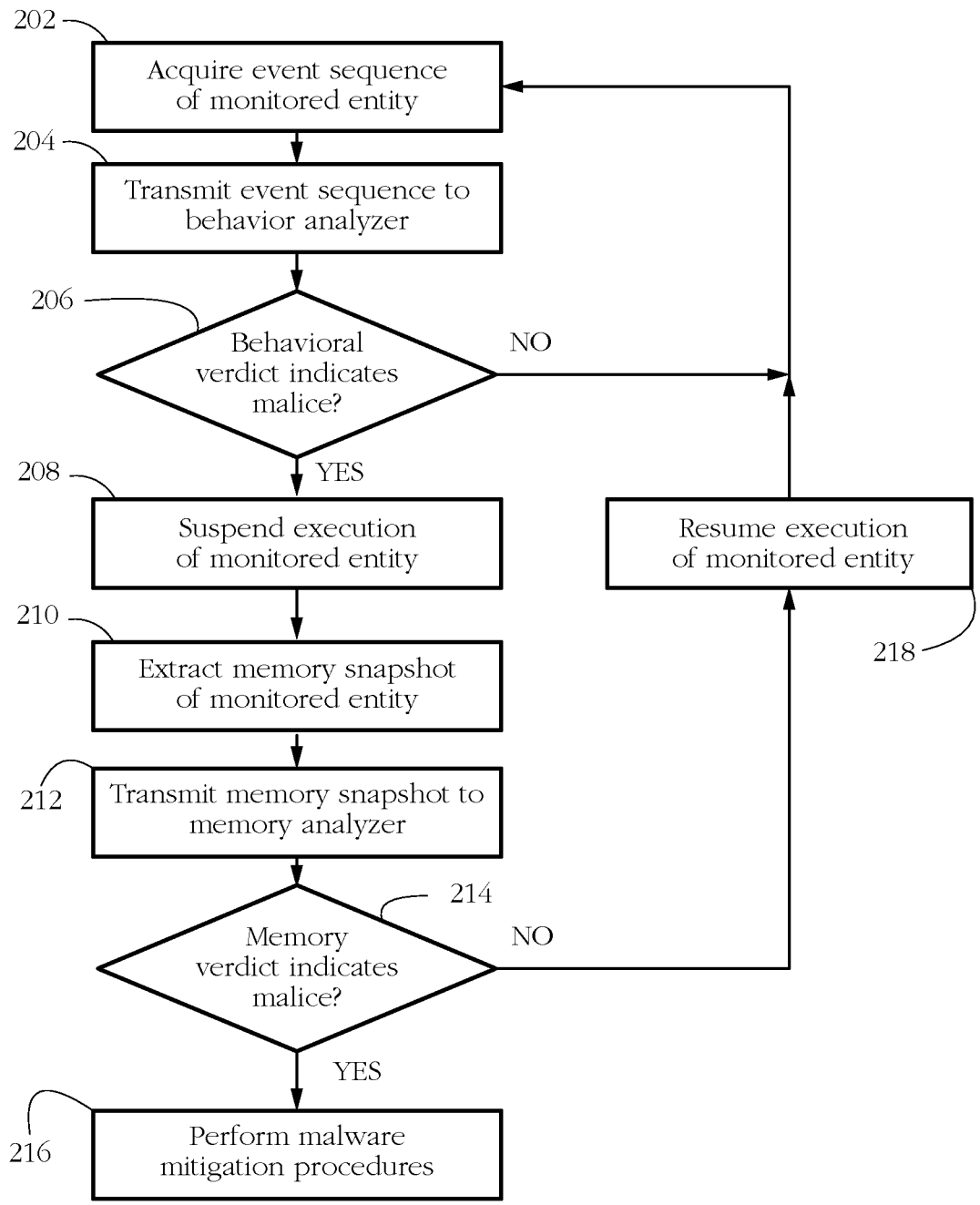
FIG. 13 shows an exemplary sequence of steps carried out by a security module according to some embodiments of the present invention.

FIG. 13 shows an exemplary sequence of steps performed by security module 44 according to some embodiments of the present invention. In a step 202, data extractor 46 acquires event sequence 52. Extractor 46 may listen for events in real time and/or extract information about the occurrence of various events from event logs, as described above in relation to FIG. 4. In some embodiments, data extractor 46 maintains a roster of currently executing software entities and/or of relations between executing software entities, and organizes detected events according to an identity of the entity which caused each detected event. Events may accumulate in a queue until an accumulation condition is satisfied. For instance, events may be accumulated until reaching a pre-determined count of events and/or for a pre-determined amount of time (e.g., 1, 10, or 30 seconds). Experiments with real data have shown that accumulating 10 seconds' worth of events may be optimal in the sense that the resulting event sequence allows for a good detection rate while keeping the false positive rate substantially low. Some embodiments detect a launch of each monitored entity and subsequently assemble event sequences according to a time elapsed between the occurrence of each event and the launch of the respective entity. One such exemplary embodiment may generate a set of distinct event sequences wherein the first sequence comprises events occurring within the first 10 seconds of execution of the respective entity, the second sequence comprises events occurring between 10 and 20 seconds after the launch of the respective entity, etc. The size of such time intervals may vary in time (e.g., the first time interval may be 1 second long, the second 10 seconds long, etc.). Another exemplary embodiment samples events according to an internal clock of security module 44, which is oblivious of each entity's launch: events may be placed into equally-sized bins (e.g. 10 second intervals) and then sorted into event sequences according to which event was caused by which monitored entity.

When the accumulation condition is satisfied, in a step 204 data extractor 46 may sort the detected events to produce event sequence 52 and further transmit sequence 52 to behavior analyzer 60. Some embodiments limit the size (count of events) of event sequence 52 to control the computational cost of malware detection. In one such example, when the count of events attributed to one monitored entity within an accumulation interval exceeds a threshold, only a subset of the respective events are included in event sequence 52. The subset may be selected from the beginning of the accumulation interval, from the end of the accumulation interval, or both. Experiments have revealed that event sequences having approximately 400 events are optimal in the sense that they provide a compromise between detection performance (detection rate and/or false positive rate) and memory cost, so an exemplary event sequence 52 may be assembled, for instance, from the first 200 and the last 200 events of the respective time interval.

In a step 206 security module 44 executes behavior analyzer 60 to produce behavioral verdict 56 indicating whether the respective monitored entity is likely to be malicious according to event sequence 52. When no, some embodiments proceed to acquire another event sequence, and/or load another queued event sequence onto behavior analyzer 60.

Verdict 56 may comprise a number indicative of a likelihood (e.g., probability) of malice. Step 206 may then comprise comparing a value of verdict 56 with a predetermined threshold and determining whether the monitored entity is malicious according to a result of said comparison. In one such example, a monitored process may be considered malicious when verdict 56 indicates a probability of malice that exceeds 0.8 (80%). When the monitored entity is malicious according to behavioral verdict 56, in a step 208 some embodiments may suspend execution of the respective software entity. In a further step 210, data extractor 46 may extract memory snapshot 54 comprising a content of a set of memory regions containing code and/or data belonging to the suspended monitored entity. Snapshot 54 is then transmitted to memory analyzer 70 in a step 212.

A step 214 executes memory analyzer 70 to produce memory verdict 58 according to snapshot 54. Step 214 may further comprise comparing verdict 58 to another pre-set threshold to determine whether verdict 58 indicates malice. When no, some embodiments resume execution of the monitored entity and proceed with acquiring a new event sequence.

In some embodiments, when memory verdict 58 indicates that the monitored entity is likely to be malicious, a step 216 carries out malware mitigation procedures, such as quarantining/incapacitating/removing the monitored entity, notifying a user of client system 10 and/or a system administrator, etc.

The description above has focused on embodiments wherein all components of security module 44 are software executing on the protected machine. A skilled artisan will appreciate that such software configurations are not meant to be limiting. In one alternative embodiment executing in a hardware virtualization embodiment (e.g., cloud computing setting), security module 44 executes within a separate virtual machine distinct from a protected VM executing the actual monitored software entities. In yet another alternative embodiment, some of the described components execute remotely on security server 12. In one such example illustrated in FIG. 14, data extractor 46 executes on client system 10, extracting event sequence 52 and/or memory snapshot 54. Meanwhile, behavior analyzer 60 and/or memory analyzer 70 may execute centrally on server 12. In turn, various parts of analyzers 60 and 70 may execute on distinct machines and/or processors, for instance in parallel computing configurations. Such configurations may have some advantages, such as having one centrally-maintained instance of an AI security system serving multiple clients, while avoiding having to deliver large software updates to clients. A further advantage of such embodiments is that the computing resources necessary for determining items such as behavioral and memory verdicts may be highly optimized for their task. For instance, some neural networks may be hard-wired as a field programmable gate array—FPGA or other application-specific integrated circuit—ASIC, implemented in firmware, etc. One potential disadvantage of such configurations comprises the need to transmit relatively large amounts of data to server 12.

Figure 14:
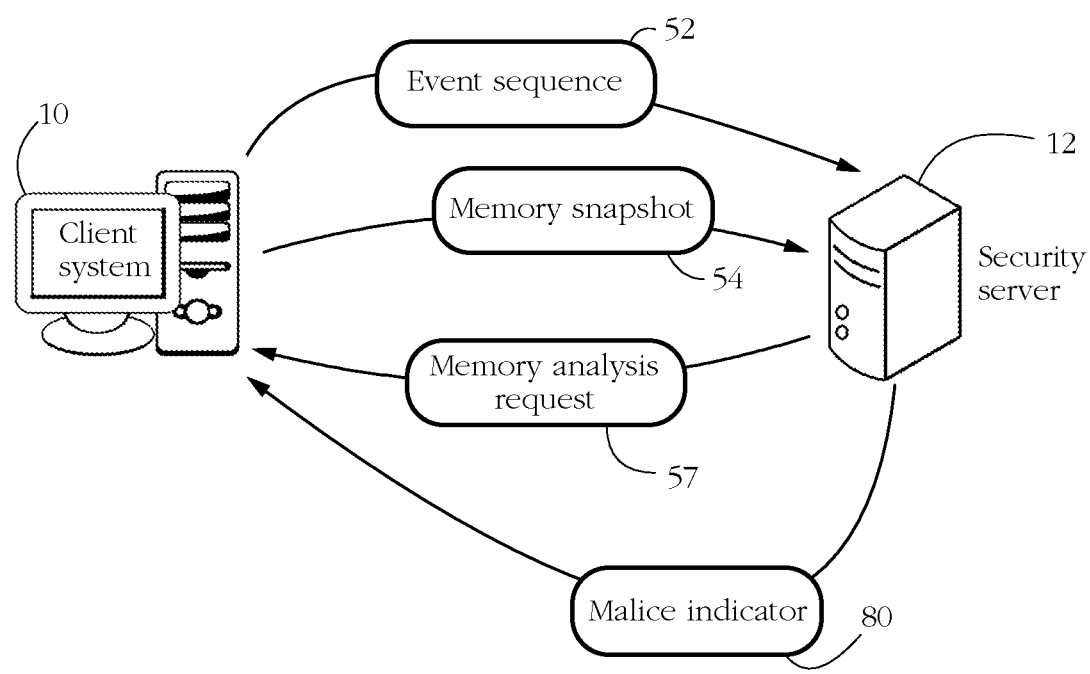
FIG. 14 shows an exemplary communication exchange in an embodiment wherein security software executes on a security server according to some embodiments of the present invention.

An exemplary operation of a de-localized computer security system as illustrated in FIG. 14 may include data extractor 46 transmitting an encoding of event sequence 52 (e.g., event embedding vectors 65) to server 12. Behavior analyzer 60 executing on server 12 may determine behavioral verdict 56 according to event sequence 52. When verdict 56 indicates a high likelihood of malice, server 12 may transmit a memory analysis request 57 to client system 10, which in return may extract and transmit memory snapshot 54 (e.g., token embedding vectors) to server 12. Memory analyzer 70 executing on server 12 may subsequently determine memory verdict 58 according to snapshot 54. When verdict 58 indicates malice, server 12 may notify the respective client via a malice indicator 80.

Figure 15:
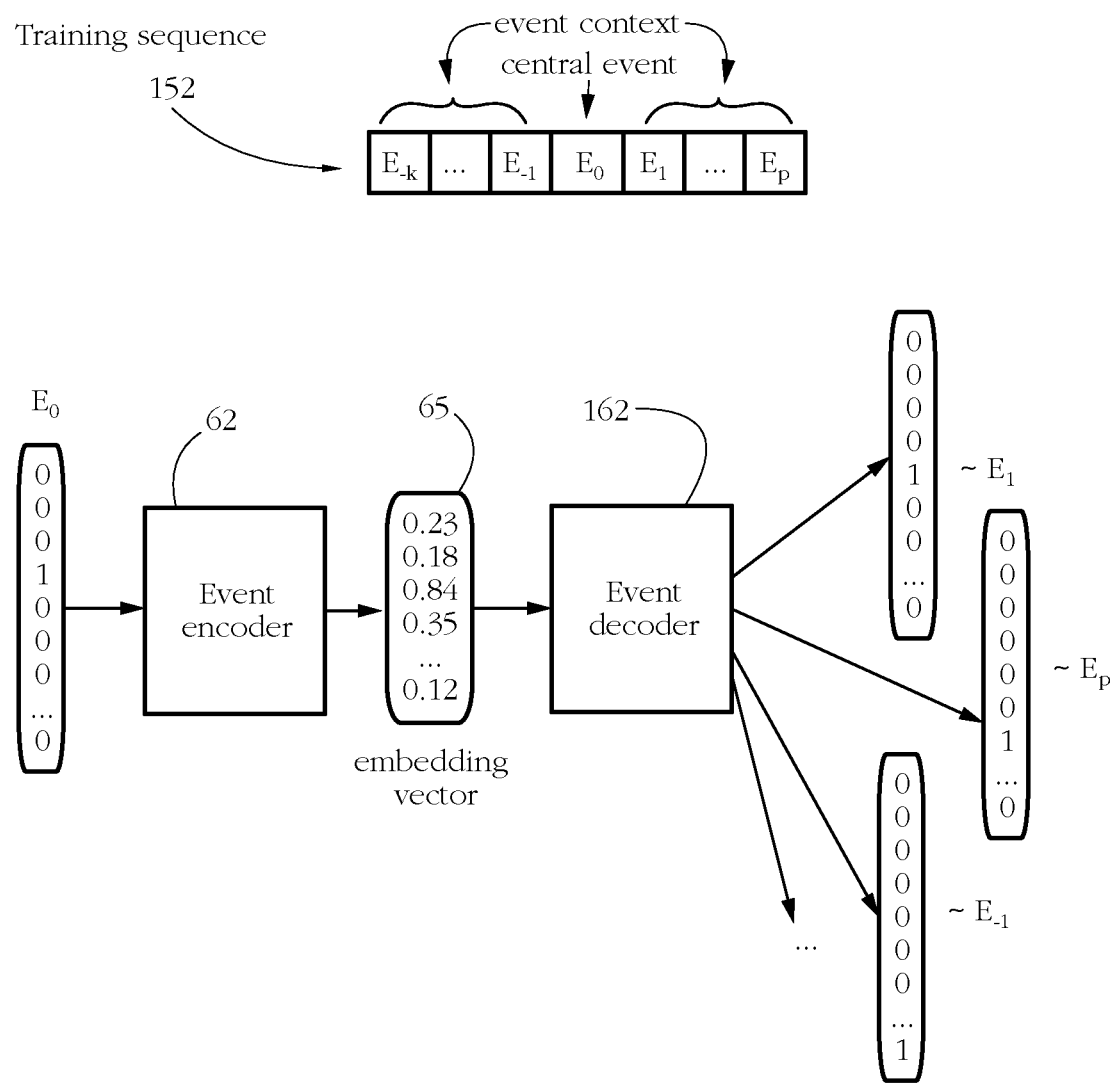
FIG. 15 illustrates an exemplary procedure for training an event encoder according to some embodiments of the present invention.
Figure 16:
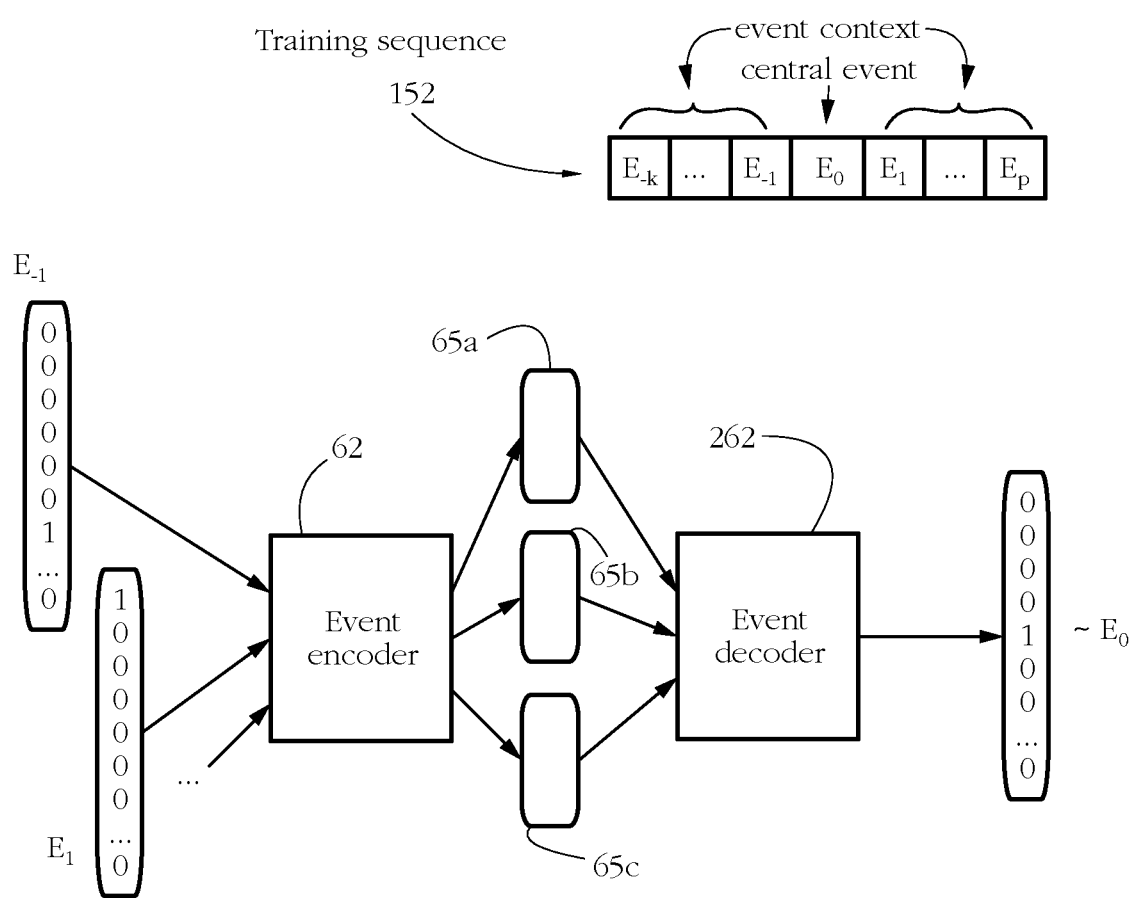
FIG. 16 shows an alternative procedure for training an event encoder according to some embodiments of the present invention.

The following description illustrates exemplary aspects of training of behavior analyzer 60 and/or memory analyzer 70 according to some embodiments of the present invention. To calculate embedding vectors 65 and/or 66, some embodiments employ a neural network trained according to a version of a word2vec algorithm. FIGS. 15-16 illustrate exemplary word2vec training procedures according to some embodiments of the present invention. Training herein signifies adjusting a set of neural network parameters (e.g., weights, biases) in the direction of reducing a cost function. Training uses a pre-assembled corpus of event sequences drawn from benign and/or malicious software entities.

For simplicity, the description focuses on exclusively on event sequences, but it may similarly extend to memory tokens. In an exemplary training procedure, event encoder 62 is paired and co-trained with an event decoder, both of which may comprise parts of a feed-forward and/or recurrent neural network. In general, the encoder-decoder pair may be configured to input a first subset of a training sequence (e.g., a central event $E_0$) and to output a prediction for a second subset of the respective sequence (e.g., some context event $E_i$, $i \neq 0$). In the examples of FIGS. 15-16, the predictions are illustrated as one-hot vectors; alternative embodiments may use a different representation. For instance, a prediction may be represented as a $N_E$-by-1 vector of numbers, each number indicating a likelihood that a corresponding event type is present in the second subset.

In a skip-gram version of training illustrated in FIG. 15, the encoder-decoder pair is trained to produce the correct event context given the central event $E_0$. For each sequence of events drawn from the training event corpus, encoder 62 is configured to input a one-hot encoding of central event $E_0$ and to produce a corresponding embedding vector 65 representing event $E_0$. In turn, decoder 162 is configured to input event vector 65 and output a plurality of guess vectors, each representing a predicted context event $E_i$ ($i \neq 0$) of the respective event sequence. Some embodiments then determine a cost function characterizing degree of mismatch between the predicted context and the actual context of the respective training event sequences. The prediction error may be calculated according to any method known in the art of artificial intelligence, for instance by determining a distance such as a Levenshtein, Euclidean, or cosine distance between the predicted and actual context events $E_i$. An alternative embodiment may determine a cost function according to a cross entropy measure. The encoder-decoder pair may then be trained by adjusting parameters of encoder 62 and/or decoder 162 in an effort to reduce the cost function. Some exemplary algorithms used for training include backpropagation using a gradient descent, simulated annealing, and genetic algorithms, among others. Some embodiments continue training until a termination condition is satisfied, for instance until the average prediction error over the training event corpus drops below a pre-determined threshold. In another embodiment, training proceeds for a pre-determined amount of time, or for a pre-determined count of iterations/epochs.

An alternative training procedure uses a continuous bag-of-words paradigm, which aims to produce the correct central event $E_0$ of a training sequence given the respective event context. In one such example illustrated in FIG. 16, event encoder 62 is configured to input a set of one-hot vectors representing context events $E_i$ ($i \neq 0$) of the training event sequence and to output embedded vectors 65a-c determined for each respective context event. In contrast to the skip-gram embodiment illustrated in FIG. 15, encoder 62 is now paired with an event decoder 262 configured to input the plurality of embedding vectors 65a-c and to produce a prediction for the central event $E_0$ of the respective training sequence. The encoder-decoder pair may then be trained by adjusting parameters of encoder 62 and/or decoder 262 in an effort to reduce the prediction error, i.e., the mismatch between the predicted central event and the actual central event of the respective training sequences.

Training behavior classifier 64 may comprise assembling a training corpus of event sequences originating from software entities which are known to be either malicious or benign, and adjusting parameters of classifier 64 (e.g., RNN weights) in the direction of minimizing the classification error. In some embodiments, harvesting training event sequences comprises launching each training entity and assigning all events occurring within each consecutive time interval (e.g., 10 second interval) into a separate event bin. To mimic the way data would be collected in a real-world detection setting, the time delay between consecutive events may be artificially altered, for instance scaled up to simulate the operation of a slower machine. Following such timescale stretching and/or shrinking, some events may move between adjacent event bins. Training event sequences may then be recruited from each event bin.

Some embodiments rely on the observation that if a software entity spawns a descendant entity (e.g., child process) during execution, when the parent is certain to be benign, then its descendants are also most likely benign. Conversely, when the parent is malicious, the descendants are not necessarily malicious. Some embodiments therefore select benign event sequences from benign software entities as well as their descendants. In contrast, some embodiments harvest malicious event sequences only from entities known to be malicious. Such training strategies may conveniently increase the size of the event corpus and may thus improve the performance of the trained classifier.

Training memory classifier 76 may comprise a similar process of assembling a training corpus of memory snapshots of software entities which are known to be either malicious or benign, and adjusting parameters of classifier 76 (e.g., CNN weights) in the direction of minimizing the classification error. Harvesting memory snapshots may comprise suspending execution of a training entity at various instants following its launch, and copying the current content of its memory space. Exemplary instants include a moment immediately following the launch of execution, and instants following the launch by approximately 1, 3, and 6 seconds. Some embodiments further rely on the observation that a memory snapshot taken at the end of an entity's life is most likely to show malice indicators, if any. Therefore, some embodiments detect an attempt to terminate a malicious entity, suspend the termination and in response, extract the current memory snapshot labelling it as malicious.

The exemplary systems and methods described above allow an efficient detection of computer security threats such as malicious software and intrusion. The disclosed systems and methods propose a combined static-behavioral approach to computer security, wherein threats are detected by monitoring events occurring during execution of software and analyzing a memory footprint of the respective software. Various experiments were conducted with trained behavior and memory analyzer as described herein. The recall/sensitivity rate of typical embodiments of behavior analyzer 60 varies between 96% and 99% with a false positive rate of 0.8% to 3% (values vary according to architecture and choice of training corpus). Similar values for recall and false positive rate were reported for some embodiments of trained memory analyzer 70.

While each method/analyzer may be used independently of the other to detect malicious software, some embodiments use a combination of the two to lower the rate of false-positive detection, i.e., to eliminate most cases where benign/legitimate software is wrongly classified as malicious by one or the other of the detection methods. A preferred embodiment may employ a behavior classifier to monitor computing events. As long as the behavior classifier determines that a detected sequence of events does not indicate malice, some embodiments may continue executing the software entity that caused the respective sequence of events. In contrast, when the behavior classifier determines that a detected set or sequence of events indicates a substantial likelihood of malice, some embodiments call on a memory classifier to determine whether the respective software entity is malicious according to a content of a memory space of the respective software entity. Some embodiments then label the suspicious software as truly malicious or not according to a verdict produced by the memory classifier. In one example, when the memory classifier determines that the monitored software entity is not malicious, security software resumes execution of the suspect entity. Some embodiments therefore combine verdicts obtained by distinct methods and criteria to improve the efficiency of detection.

Some conventional anti-malware solutions are known to combine multiple detection criteria, for instance by determining a plurality of malware-indicative scores according to distinct aspects and/or algorithms and combining the respective scores into an aggregate score. In contrast to such conventional approaches wherein different detectors are used in parallel, in some embodiments of the present invention behavioral detection and memory analysis are deliberately applied in sequence, with the explicit aim of reducing the rate of false alarms. Stated otherwise, the second detector is only called on to double-check cases classified by the first detector as likely to be malicious. In computer experiments, applying analyzers 60 and 70 in sequence as shown herein has been shown to lower the overall false positive detection 20 to 30-fold to approximately 0.1% while keeping the true detection rate above 98%.

The order in which behavioral and memory analysis are used is also deliberately chosen to lower the computational cost of malware detection. Some embodiments rely on the observation that memory analysis typically requires substantially more computing resources than behavioral monitoring. Furthermore, extracting a memory snapshot may require suspending execution of the monitored entity to ensure the consistency of the respective memory snapshot, thus impacting user experience. In contrast, event acquisition and behavioral analysis of event sequences may be performed in real time, while the monitored software is executing. Some embodiments therefore employ behavioral analysis as the first step of malware detection, and only suspend execution of the monitored entity for memory analysis when behavioral analysis indicates a substantial likelihood of malice.

Figure 17:
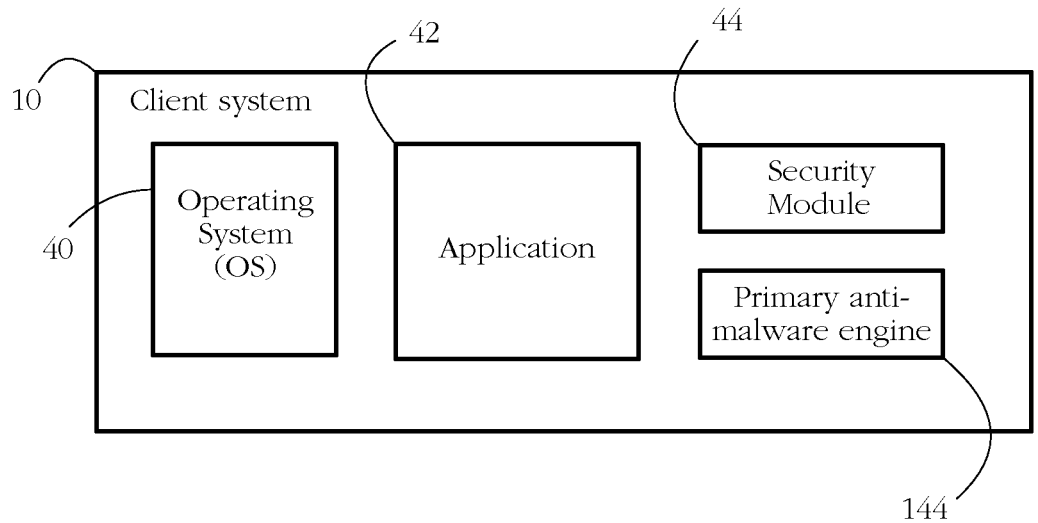
FIG. 17 shows exemplary software components in an alternative embodiment of the present invention.

In one particular example of alternative embodiment illustrated in FIG. 17, security module 44 is installed as an add-on to a machine that already has a primary anti-malware engine 144 protecting the respective machine. Primary engine 144 may employ any method known in the art to determine whether a software entity is malicious, for instance any combination of static and behavioral detection techniques. Meanwhile, security module 44 may use a neural-network classifier to provide a second opinion in a manner which lowers the rate of false alarms. Engine 144 and security module 44 may even be provided by two separate developers.

Figure 18:
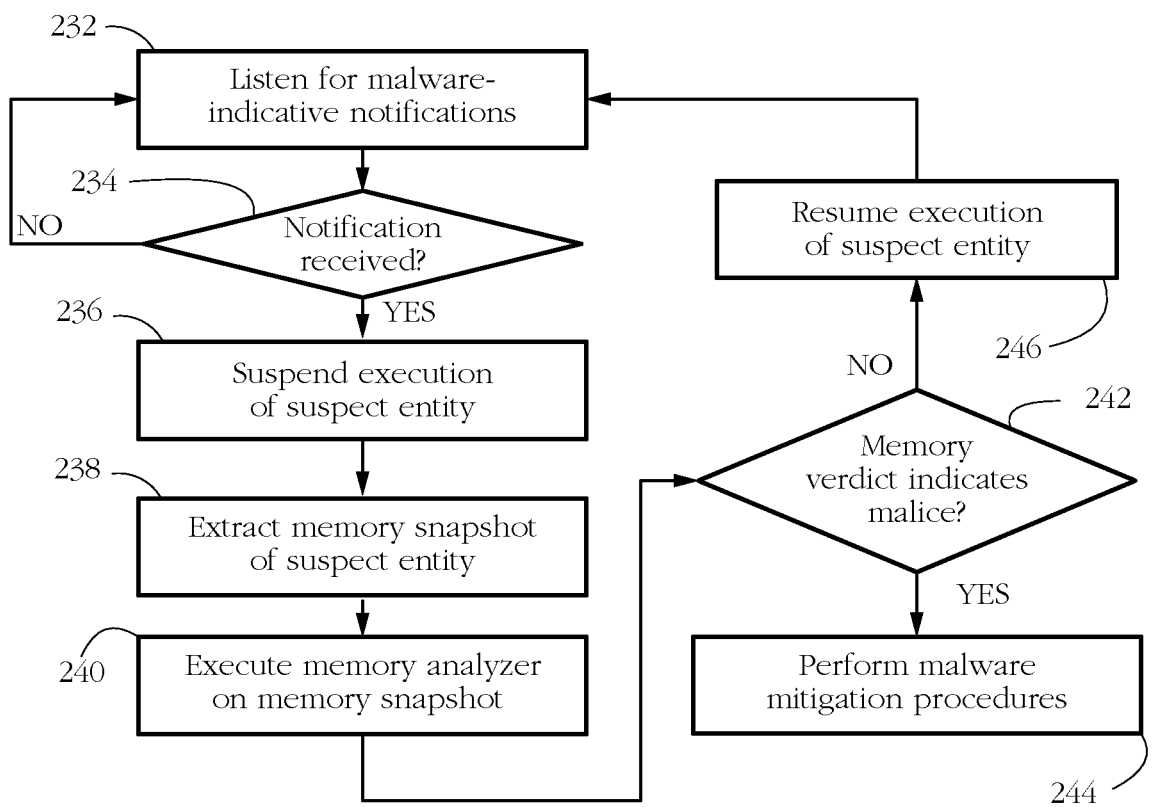
FIG. 18 shows an exemplary sequence of steps carried out by the security module in an alternative embodiment of the present invention.

FIG. 18 shows an exemplary sequence of steps performed by security module 44 in such an embodiment. Security module 44 may execute at a user level of processor privilege (e.g., ring 3). In a sequence of steps 232-234, security module 44 may listen for a notification indicating that that a monitored entity is likely to be malicious. The notification may be explicitly generated by primary engine 144 or by another software component in response to engine 144 indicating potential malice. When such a notification is received, a sequence of steps 236-238 extracts a memory snapshot of the respective suspect entity. In a further step 240, security module 44 may execute memory analyzer 70 on the extracted snapshot. When memory verdict 58 indicates that the suspect entity is indeed malicious, a step 244 may carry out mitigation. Otherwise, in a step 246, the suspect entity may be declared benign and may be allowed to resume execution.

In some embodiments, behavioral detection comprises analyzing sequences of events occurring during execution of a monitored software entity (e.g., process, virtual machine, etc.) Exemplary monitored events include, among others, process launches, attempts to access certain disk files or network locations, attempts to set operating system parameters, etc. A skilled artisan will understand that the systems and methods described herein may be adapted to analyzing other kinds of events, such as events related to a user's activity on social media, a user's browsing history, and a user's gaming activity, among others.

Conventional behavioral malware detection typically relies on a pre-determined set of rules, which must be devised, tested, and maintained by human operators. However, malware often changes to evade detection, and conventional methodology may struggle to keep up with the pace of change. In contrast, in some embodiments of the present invention, behavior and/or memory classifiers include neural network classifiers trained on a corpus of samples extracted from known malicious and/or benign entities. The use of machine learning technologies and training on real data may ensure that classifiers constructed according to some embodiments of the present invention are capable of detecting malware-identifying patterns within the data without having to provide explicit rules. Furthermore, some embodiments repeatedly re-train the classifiers on samples of newly detected threats. The plasticity built into neural network classifiers may cause such systems to adapt to changes in malicious behavior substantially quicker, and at substantially smaller cost, than human operators can devise new malware-detecting heuristics.

Some conventional computer security systems and methods mostly analyze individual events to determine whether they are indicative of a security threat. However, many events occurring during operation of a computer system (e.g., opening a file, accessing a webpage) may not be indicative of malice when taken in isolation, but they may be malicious when occurring in the context of other events, for instance as a particular sequence of actions. In contrast to more conventional solutions, some embodiments of the present invention explicitly analyze events in context and are therefore better suited to such event correlation situations. A preferred embodiment represents individual events as vectors in a multidimensional embedding space having the distinctive property that a pair of events that occur with relatively high frequency in the same event context are separated by a smaller distance than another pair of events that occur less frequently in the same event context.

Some embodiments of behavior and/or memory classifiers as described herein implement specific neural network architectures including convolutional and/or recurrent neural networks, among others. The choice of such architectures is deliberate, because such configurations explicitly consider individual events and/or memory tokens in context as opposed to in isolation, and are therefore particularly effective for malware detection. For instance, since RNNs receive and process input as an ordered sequence, a behavior analyzer comprising a RNN determines whether a software entity is malicious not only according to a type of events that occur during execution of the respective entity, but also according to an order in which the respective events occur, and also according to a context of each event. Similarly, a memory analyzer to comprising a convolutional neural network detects malice not only according to the presence of certain tokens (e.g., text strings), but also according to a location of the respective token within a memory snapshot of the respective entity and/or according to a relative position of different tokens within the memory snapshot.

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one hardware processor configured to execute a data extractor and a behavior analyzer to determine whether a software entity is malicious, wherein:
    executing the data extractor comprises:
        identifying a plurality of events occurring within a pre-determined time interval and caused by an execution of the software entity, and
        constructing an ordered event sequence according to the plurality of events, the ordered event sequence ordered according to a time of occurrence of each respective event, and wherein constructing the ordered event sequence comprises, in response to determining that a count of the plurality of events exceeds a pre-determined threshold, selectively including in the ordered event sequence a first subset of the plurality of events having occurred early within the time interval and a second subset of events having occurred late within the time interval, without including in the ordered event sequence any events having occurred in between the first subset and the second subset of events; and executing the behavior analyzer comprises employing a pre-trained neural network to determine whether the ordered event sequence is indicative of malice.

2. The computer system of claim 1, wherein the neural network comprises a recurrent neural network.

3. The computer system of claim 1, wherein the neural network comprises a convolutional neural network.

4. The computer system of claim 1, wherein:
executing the data extractor further comprises extracting a memory snapshot of the software entity, wherein extracting the memory snapshot comprises:
identifying a memory page within a memory of the computer system according to whether the memory page is used by the software entity, and
copying a set of data from the memory page into the memory snapshot; and
wherein the at least one hardware processor is further configured to, in response to the behavior analyzer determining that the ordered event sequence is indicative of malice, execute a memory analyzer, wherein executing the memory analyzer comprises:
parsing the memory snapshot to identify a set of character strings contained within the memory snapshot,
constructing a plurality of tokens according to the identified character strings,
arranging the plurality of tokens according to a memory location of the identified character strings to form a token sequence, and
employing another pre-trained neural network to determine whether the software entity is malicious according to the token sequence.

5. The computer system of claim 1, wherein executing the data extractor comprises:
determining an amount of time elapsed between a start of the execution of the software entity and the time of occurrence of each respective event; and
determine whether to include each respective event into the ordered event sequence according to the amount of time.

6. The computer system of claim 1, wherein:
constructing the ordered event sequence comprises determining a sequence of event indicators, each event indicator characterizing a respective event of the ordered event sequence, each event indicator determined according to a pre-determined event vocabulary, each member of the event vocabulary characterized by a tuple consisting of an event type co-occurring with at least another event feature; and
the neural network is configured to determine whether the software entity is malicious according to the sequence of event indicators.

7. A malware-detection method comprising employing at least one hardware processor to execute a data extractor and a behavior analyzer to determine whether a software entity is malicious, wherein:
executing the data extractor comprises:
identifying a plurality of events occurring within a pre-determined time interval and caused by an execution of the software entity, and
constructing an ordered event sequence according to the plurality of events, the ordered event sequence ordered according to a time of occurrence of each respective event, and wherein constructing the ordered event sequence comprises, in response to determining that a count of the plurality of events exceeds a pre-determined threshold, selectively including in the ordered event sequence a first subset of the plurality of events having occurred early within the time interval and a second subset of events having occurred late within the time interval, without including in the ordered event sequence any events having occurred in between the first subset and the second subset of events; and
executing the behavior analyzer comprises employing a pre-trained neural network to determine whether the ordered event sequence is indicative of malice.

8. The method of claim 7, wherein the neural network comprises a recurrent neural network.

9. The method of claim 7, wherein the neural network comprises a convolutional neural network.

10. The method of claim 7, wherein
executing the data extractor further comprises extracting a memory snapshot of the software entity, wherein extracting the memory snapshot comprises:
identifying a memory page within a memory of the computer system according to whether the memory page is used by the software entity, and
copying a set of data from the memory page into the memory snapshot; and
wherein the method further comprises, in response to the behavior analyzer determining that the ordered event sequence is indicative of malice, employing the at least one hardware processor to execute a memory analyzer, wherein executing the memory analyzer comprises:
parsing the memory snapshot to identify a set of character strings contained within the memory snapshot,
constructing a plurality of tokens according to the identified character strings,
arranging the plurality of tokens according to a memory location of the identified character strings to form a token sequence, and
employing another pre-trained neural network to determine whether the software entity is malicious according to the token sequence.

11. The method of claim 7, wherein executing the data extractor comprises:
determining an amount of time elapsed between a start of the execution of the software entity and the time of occurrence of each respective event; and
determine whether to include each respective event into the ordered event sequence according to the amount of time.

12. The method of claim 7, wherein:
constructing the ordered event sequence comprises determining a sequence of event indicators, each event indicator characterizing a respective event of the ordered event sequence, each event indicator determined according to a pre-determined event vocabulary, each member of the event vocabulary characterized by a tuple consisting of an event type co-occurring with at least another event feature; and
the neural network is configured to determine whether the software entity is malicious according to the sequence of event indicators.

13. A non-transitory computer-readable medium storing instructions which, when executed by at least one hardware processor of a computer system, cause the computer system to execute a data extractor and a behavior analyzer to determine whether a software entity is malicious, wherein:

executing the data extractor comprises:
  identifying a plurality of events occurring within a pre-determined time interval and caused by an execution of the software entity, and
  constructing an ordered event sequence from members of the plurality of events, the ordered event sequence ordered according to a time of occurrence of each respective event, and wherein constructing the ordered event sequence comprises, in response to determining that a count of the plurality of events exceeds a pre-determined threshold, selectively including in the ordered event sequence a first subset of the plurality of events having occurred early within the time interval and a second subset of events having occurred late within the time interval, without including in the ordered event sequence any events having occurred in between the first subset and the second subset of events; and
executing the behavior analyzer comprises employing a pre-trained neural network to determine whether the ordered event sequence is indicative of malice.

* * * * *